US011892579B2

(12) United States Patent
Hogarth et al.

(10) Patent No.: US 11,892,579 B2
(45) Date of Patent: Feb. 6, 2024

(54) CROSSWELL MICROSEISMIC SYSTEM

(71) Applicant: Schlumberger Technology Corporation, Sugar Land, TX (US)

(72) Inventors: Leah Hogarth, Houston, TX (US); Joel Herve Le Calvez, Houston, TX (US); Herve Denaclara, Stafford, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/282,096

(22) Filed: Sep. 30, 2016

(65) Prior Publication Data

US 2018/0095184 A1  Apr. 5, 2018

(51) Int. Cl.
*G01V 1/28* (2006.01)
*G01V 1/42* (2006.01)

(52) U.S. Cl.
CPC .............. *G01V 1/288* (2013.01); *G01V 1/282* (2013.01); *G01V 1/42* (2013.01); *G01V 2210/1234* (2013.01)

(58) Field of Classification Search
CPC ...................................................... G01V 1/288
See application file for complete search history.

(56) References Cited

U.S. PATENT DOCUMENTS

| | | | | |
|---|---|---|---|---|
| 6,462,672 B1 * | 10/2002 | Besson | ................... | E21B 47/00 340/853.2 |
| 6,891,477 B2 * | 5/2005 | Aronstam | ............... | E21B 47/12 340/606 |
| 2004/0093163 A1 * | 5/2004 | Reshef | ................... | G01V 1/303 702/14 |
| 2005/0280419 A1 * | 12/2005 | Chen | ...................... | G01V 3/265 324/324 |
| 2006/0023567 A1 * | 2/2006 | Uhl | ........................ | G01V 1/008 367/13 |
| 2008/0159075 A1 * | 7/2008 | Underhill | ................ | G01V 1/42 367/50 |

(Continued)

FOREIGN PATENT DOCUMENTS

| | | | | |
|---|---|---|---|---|
| WO | WO-2014105086 A1 * | 7/2014 | ............... | G01V 3/18 |
| WO | WO 2014205162 A1 * | 12/2014 | ............. | E21B 43/26 |
| WO | 2015187136 A1 | 12/2015 | | |

OTHER PUBLICATIONS

Ajayi, et al., "Using Microseismic Monitoring as a Real Time Completions Diagnostic Tool in Unconventional Reservoirs: Field Case Studies," SPE Eastern Regional Meeting, 2011.

(Continued)

*Primary Examiner* — Hyun D Park
(74) *Attorney, Agent, or Firm* — Jeffrey D. Frantz

(57) ABSTRACT

A method can include receiving seismic data responsive to stimulation of an anisotropic formation via a well disposed in the formation; receiving crosswell calibrated velocity model information that spans a depth range of the anisotropic formation; locating a microseismic event generated by the stimulation based at least in part on a portion of the received seismic data and based at least in part on the crosswell calibrated velocity model information; and rendering the located microseismic event to a display with respect to one or more dimensions of the anisotropic formation.

19 Claims, 12 Drawing Sheets

(56) References Cited

U.S. PATENT DOCUMENTS

| | | | | |
|---|---|---|---|---|
| 2008/0316860 | A1* | 12/2008 | Muyzert | G01V 1/42 367/25 |
| 2009/0010104 | A1* | 1/2009 | Leaney | G01V 1/364 367/47 |
| 2010/0195436 | A1* | 8/2010 | Kamata | G01V 1/44 367/25 |
| 2012/0051178 | A1 | 3/2012 | Zhang et al. | |
| 2013/0128693 | A1* | 5/2013 | Geiser | G01V 1/288 367/27 |
| 2013/0235693 | A1* | 9/2013 | Ball | G01V 1/50 367/31 |
| 2013/0245953 | A1* | 9/2013 | Gonzales | E21B 43/26 702/13 |
| 2014/0119159 | A1* | 5/2014 | Le Calvez | G01V 1/44 367/57 |
| 2015/0330211 | A1* | 11/2015 | Kabatek | E21B 47/065 166/250.01 |
| 2016/0299246 | A1* | 10/2016 | Minto | G01V 1/44 |

OTHER PUBLICATIONS

Cipolla, et al., "A Practical Guide to Interpreting Microseismic Measurements," Society of Petroleum Engineers 2011.

Daniels, et al., "Contacting more of the Barnett Shale through an integration of real-time microseismic monitoring, petrophysics and hydraulic fracture design," SPE Annual Technical Conference and Exhibition 2007 Anaheim, SPE 110562.

Eisner, et al., "Borehole deviation surveys are necessary for hydraulic fracture monitoring," 76th Annual International Meeting, 2006, SEG Expanded Abstracts, pp. 359-362.

Erwemi, et al., "Anisotropic velocity modeling for microseismic processing, Part 3: Borehole sonic calibration case study," SEG Annual Meeting 2010, Expanded Abstract.

Jocker, et al., "Seismic Anisotropy Characterization in Heterogeneous Formations Using Borehole Sonic Data," SPE Annual Technical Conference and Exhibition 2013.

Jones, et al., "Microseismic event location accuracy improvement from the use of anisotropic velocity models," GeoCanada 2010 Abstract.

Le Calvez, et al, "Real-time microseismic monitoring of hydraulic fracture treatment: a tool to improve completion and reservoir managements," SPE Hydraulic Fracturing Technology Conference 2007 College Station, SPE 106159.

Le Calvez, et al., "Hydraulic Fracturing Insights from Microseismic Monitoring," Oilfield Review, 2016, 28(2).

Le Calvez, et al., "Tool and velocity model calibration for downhole-based hydraulic fracture monitoring of induced microseismicity," 83rd Annual Meeting, 2013, SEG, Expanded Abstracts.

Leiceaga, eta l., "Crosswell seismic applications for improved reservoir understanding," The Leading Edge 2015, vol. 34, pp. 422-428.

Maxwell, "Microseismic: Growth born of success," The Leading Edge, 2010, vol. 29, No. 3, pp. 338-343.

Maxwell, et al., "Anisotropic Velocity Modeling for Microseismic Processing, Part I—Impact of Velocity model uncertainty," presented at the 80th Annual International Meeting, 2010, SEG, Expanded Abstracts.

Thomsen, "Weak elastic anisotropy," Geophysics 1986, vol. 51, pp. 1954-1966.

Waters, et al., "Use of Horizontal Well Image Tools to Optimize Barnett Shale," In Proceedings of Reservoir Exploitation, SPE Annual Technical Conference and Exhibition, San Antonio, Texas, USA, Sep. 24-27, 2006.

Woerpel, "Anisotropic velocity modeling for microseismic processing: Part 2—Fast and accurate model calibration with a cross-well source," SEG Annual Meeting 2010, Expanded Abstract.

Zakhour, et al., "Real-Time Use of Microseismic Monitoring for Horizontal Completion Optimization Across a Major Fault in the Eagle Ford Formation," SPE Hydraulic Fracturing Technology Conference 2015, Woodlands, Texas, SPE-173353.

Extended Search Report for the equivalent European patent application 17193923.4 dated Feb. 12, 2018.

Zhang, et al., "Velocity modeling and inversion techniques for locating microseismic events in unconventional reservoirs," Journal of Earth Science, China University of Geosciences, Heidelberg, vol. 26, No. 4, Jul. 25, 2015, pp. 495-501.

Yaskevich, et al., "Processing microseismic monitoring data, considering seismic anisotropy of rocks," Journal of Mining Science, SP Maik Nauka/Interperiodica, Dordrecht, vol. 51, No. 3, Jan. 13, 2016, pp. 477-486.

Neuhaus, et al., "Utilization of Anisotropic Velocity Models in Surface Microseismic Monitoring to Improve Hydraulic Fracturing Event Location Accuracy in Shale Plays," SPE Canadian Unconventional Resources Conference, Nov. 1, 2012, pp. 1-7.

Communication Pursuant to Article 94(3) issued in European Patent Application 17193923.4 dated Jul. 28, 2021, 7 pages.

Craig Woerpel., Anisotropic velocity modeling for microseismic processing: Part 2—Fast and accurate model calibration with a cross-well source, SEG Technical Program Expanded Abstracts 2010, Jan. 1, 2010, pp. 2135-2139.

\* cited by examiner

CROSSWELL MICROSEISMIC SYSTEM

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

SUMMARY

In accordance with some embodiments, a method includes receiving seismic data responsive to stimulation of an anisotropic formation via a well disposed in the formation; receiving crosswell calibrated velocity model information that spans a depth range of the anisotropic formation; locating a microseismic event generated by the stimulation based at least in part on a portion of the received seismic data and based at least in part on the crosswell calibrated velocity model information; and rendering the located microseismic event to a display with respect to one or more dimensions of the anisotropic formation. In accordance with some embodiments, a system includes a processor; memory accessible by the processor; processor-executable instructions stored in the memory that include instructions to instruct the system to: receive seismic data responsive to stimulation of an anisotropic formation via a well disposed in the anisotropic formation; receive crosswell calibrated velocity model information that spans a depth range of the anisotropic formation; locate a microseismic event generated by the stimulation based at least in part on a portion of the received seismic data and based at least in part on the crosswell calibrated velocity model information; and render the located microseismic event to a display with respect to one or more dimensions of the formation. In accordance with some embodiments, one or more computer-readable storage media include computer-executable instructions to instruct a system to: receive seismic data responsive to stimulation of an anisotropic formation via a well disposed in the formation; receive crosswell calibrated velocity model information that spans a depth range of the anisotropic formation; locate a microseismic event generated by the stimulation based at least in part on a portion of the received seismic data and based at least in part on the crosswell calibrated velocity model information; and render the located microseismic event to a display with respect to one or more dimensions of the anisotropic formation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 1:
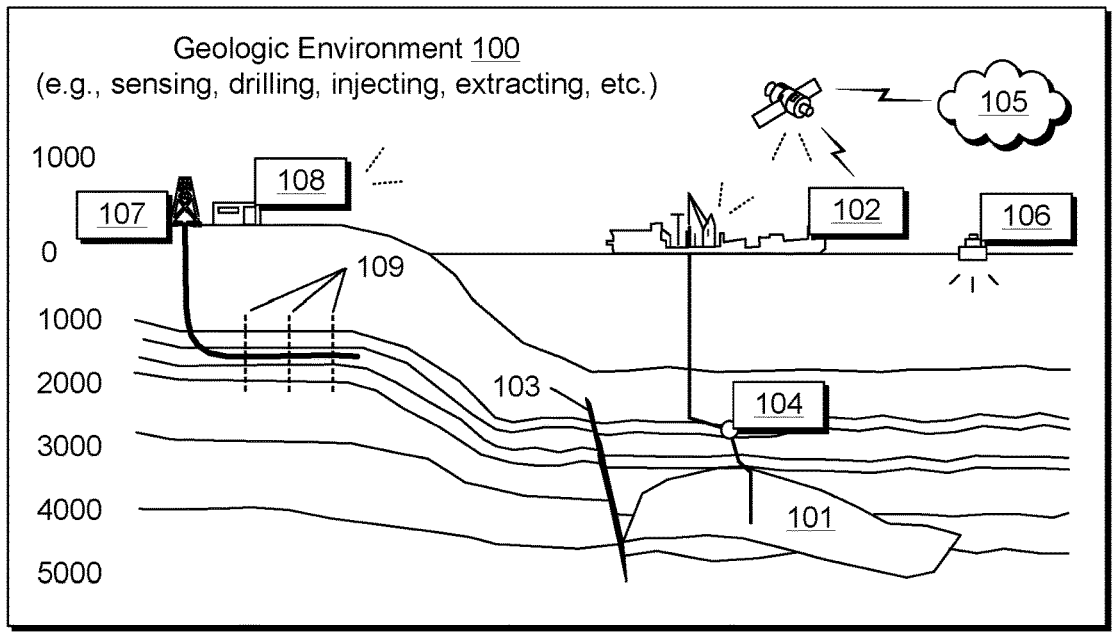
FIG. 1 illustrates an example of a geologic environment and an example of a technique.
Figure 1:
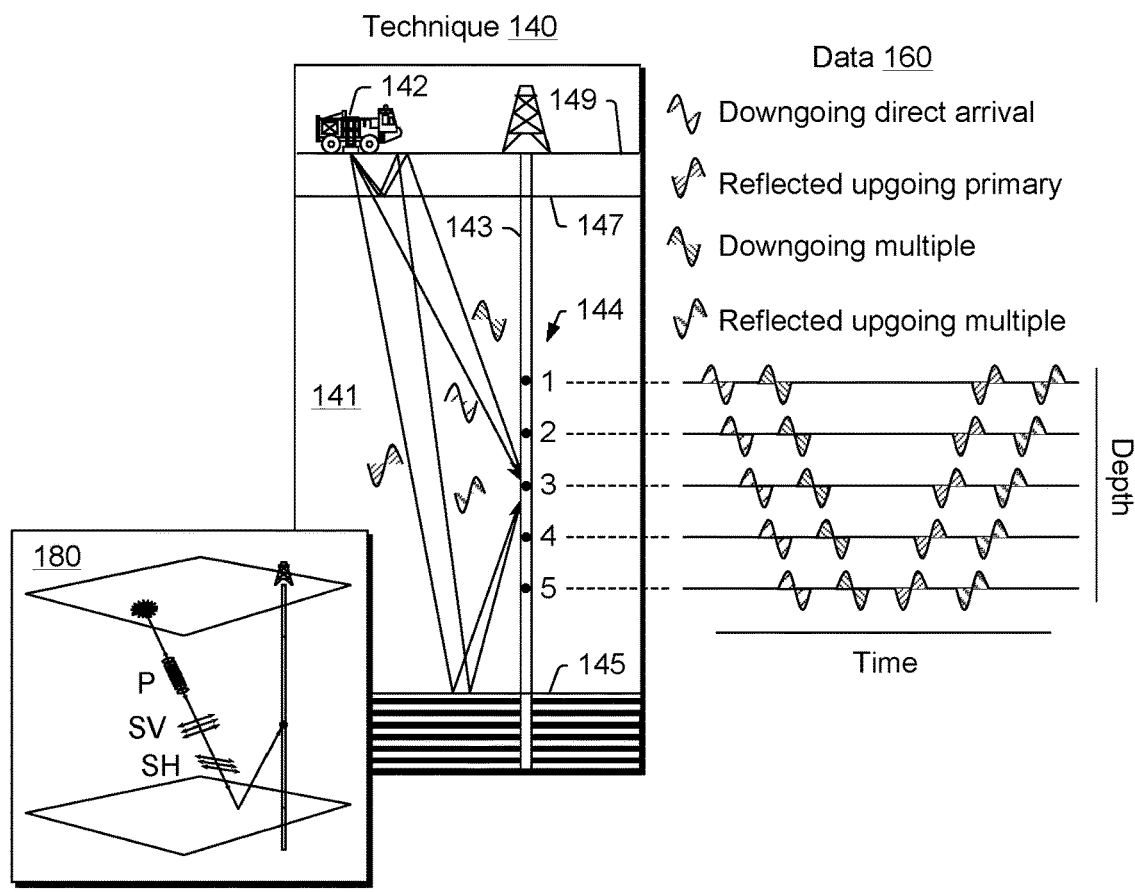

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data. As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, a system may include features of a commercially available simulation framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 100 may include layers (e.g., stratification) that include the reservoir 101 and that may be intersected by a fault 103 (see also, e.g., the one or more fractures 109, which may intersect a reservoir). As an example, a geologic environment may be or include an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces (see also, e.g., FIG. 2), evidence of a multiple from a water interface (e.g., an interface of a base of water and rock or sediment beneath it) or evidence of a multiple from an air-water interface, etc.

As shown in FIG. 1, acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
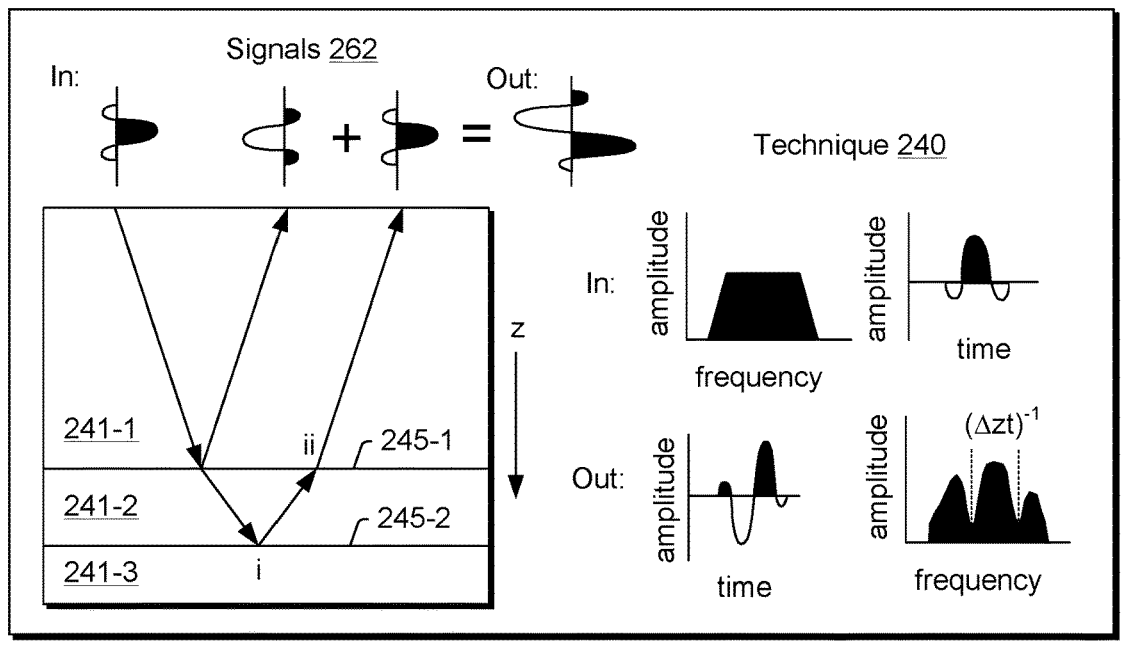
FIG. 2 illustrates examples of multiple reflections and examples of techniques.

FIG. 2 shows an example of a technique 240, examples of signals 262 associated with the technique 240, examples of interbed multiple reflections 250 and examples of signals 264 and data 266 associated with the interbed multiple reflections 250. As an example, the technique 240 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 262) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As to the data 266, they illustrate further transmissions of emitted energy, including transmissions associated with the interbed multiple reflections 250. For example, while the technique 240 is illustrated with respect to interface related events i and ii, the data 266 further account for additional interface related events, denoted iii, that stem from the event ii. Specifically, as shown in FIG. 2, energy is reflected downward by the interface 245-1 where a portion of that energy is transmitted through the interface 245-2 as an interbed downgoing multiple and where another portion of that energy is reflected upward by the interface 245-2 as an interbed upgoing multiple. These portions of energy may be received by one or more receivers 244 (e.g., disposed in a well 243) as signals. These signals may be summed with other signals, for example, as explained with respect to the technique 240. For example, such interbed multiple signals may be received by one or more receivers over a period of time in a manner that acts to "sum" their amplitudes with amplitudes of other signals (see, e.g., illustration of signals 262 where interbed multiple signals are represented by a question mark "?"). In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.).

Figure 3:
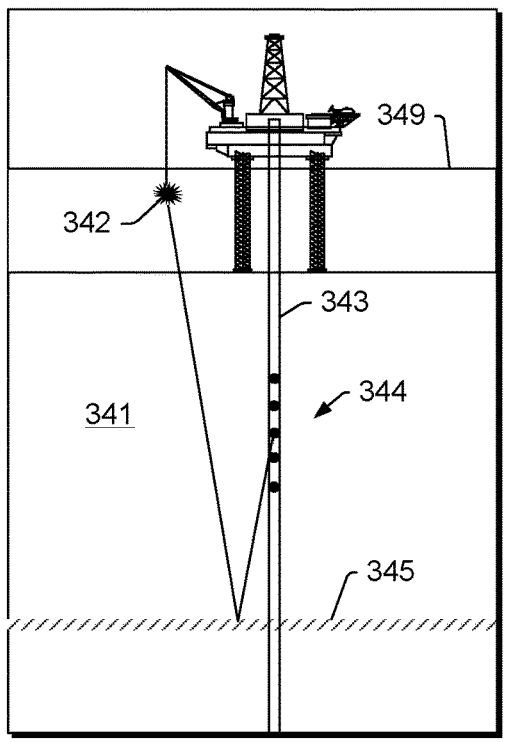
FIG. 3 illustrates examples of survey techniques.
Figure 3:
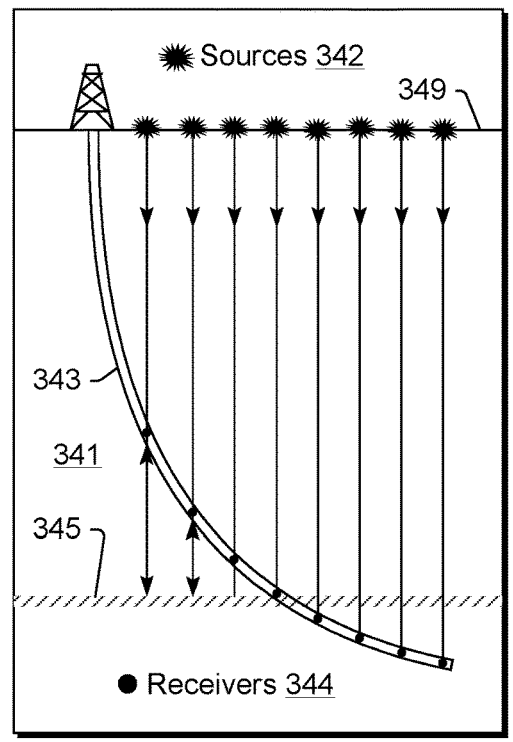
Figure 3:
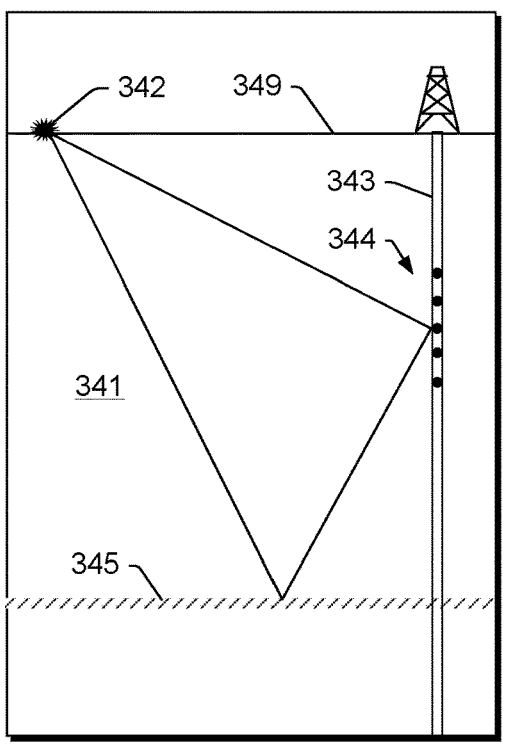
Figure 3:
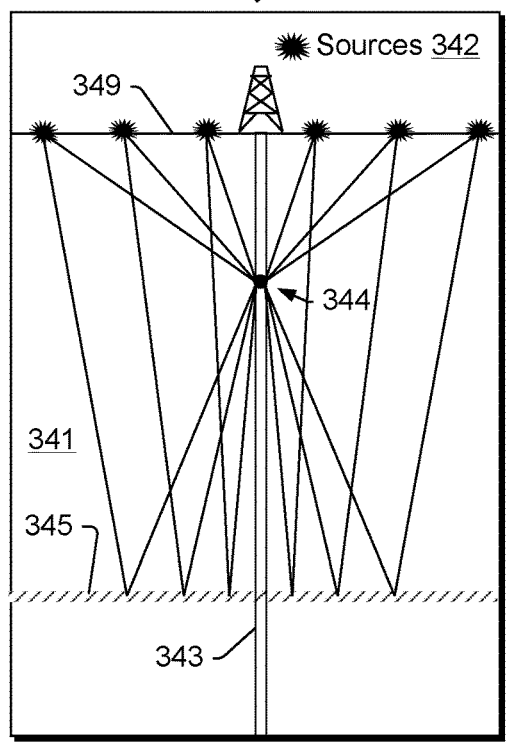

FIG. 3 shows some examples of data acquisition techniques or "surveys" that include a zero-offset vertical seismic profile (VSP) technique 301, a deviated well vertical seismic profile technique 302, an offset vertical seismic profile technique 303 and a walkaway vertical seismic profile technique 304. In each of the examples, a geologic environment 341 with a surface 349 is shown along with at least one energy source (e.g., a transmitter) 342 that may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by at least one of the one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave.

As to the example techniques 301, 302, 303 and 304, these are described briefly below, for example, with some comparisons. As to the technique 301, given the acquisition geometry, with no substantial offset between the source 342 and bore 343, a zero-offset VSP may be acquired. In such an example, seismic waves travel substantially vertically down to a reflector (e.g., the layer 345) and up to the receiver 344, which may be a receiver array. As to the technique 302, this may be another so-called normal-incidence or vertical-incidence technique where a VSP may be acquired in, for example, a deviated bore 243 with one or more of the source 342 positioned substantially vertically above individual receivers 344 (e.g., individual receiver shuttles). The technique 302 may be referred to as a deviated-well or a walkabove VSP. As to the offset VSP technique 303, in the example of FIG. 3, an array of seismic receivers 344 may be clamped in a bore 343 and a seismic source 342 may be placed a distance away. In such an example, non-vertical incidence can give rise to P- to S-wave conversion. As to the walkaway VSP technique 304, as an example, a seismic source 342 may be activated at numerous positions along a line on the surface 349. The techniques 301, 302, 303 and 304 may be implemented as onshore and/or offshore surveys.

As may be appreciated from the examples of FIG. 3, a borehole seismic survey may be categorized by a survey geometry, which may be determined by source offset, borehole trajectory and receiver array depth. For example, a survey geometry may determine dip range of interfaces and the subsurface volume that may be imaged. As an example, a survey may define a region, for example, a region about a borehole (e.g., via one or more dimensions that may be defined with respect to the borehole). As an example, positions of equipment may define, at least in part, a survey geometry (e.g., and a region associated with a borehole, wellbore, etc.).

The example techniques 301, 302, 303 and 304 of FIG. 3 may be applied, for example, to provide information and/or images in one or two dimensions (e.g., or optionally three-dimensions, depending on implementation).

As an example, a data acquisition technique may be implemented to help understand a fracture, fractures, a fracture network, etc. As an example, a fracture may be a natural fracture, a hydraulic fracture, a fracture stemming from production, etc. As an example, seismic data may help to characterize direction and magnitude of anisotropy that may arise from aligned natural fractures. As an example, a survey may include use of offset source locations that may span, for example, a circular arc to probe a formation (e.g., from a wide range of azimuths). As an example, a hydraulically induced fracture or fractures may be monitored using one or more borehole seismic methods. For example, while a fracture is being created in a treatment well, a multicomponent receiver array in a monitor well may be used to record microseismic activity generated by a fracturing process.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures. As an example, activation may occur with respect to a pre-existing feature such as a fault or a fracture. As an example, a pre-existing fracture network may be at least in part activated via a method that includes applying fluid pressure in a subterranean environment. The foregoing method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 4:
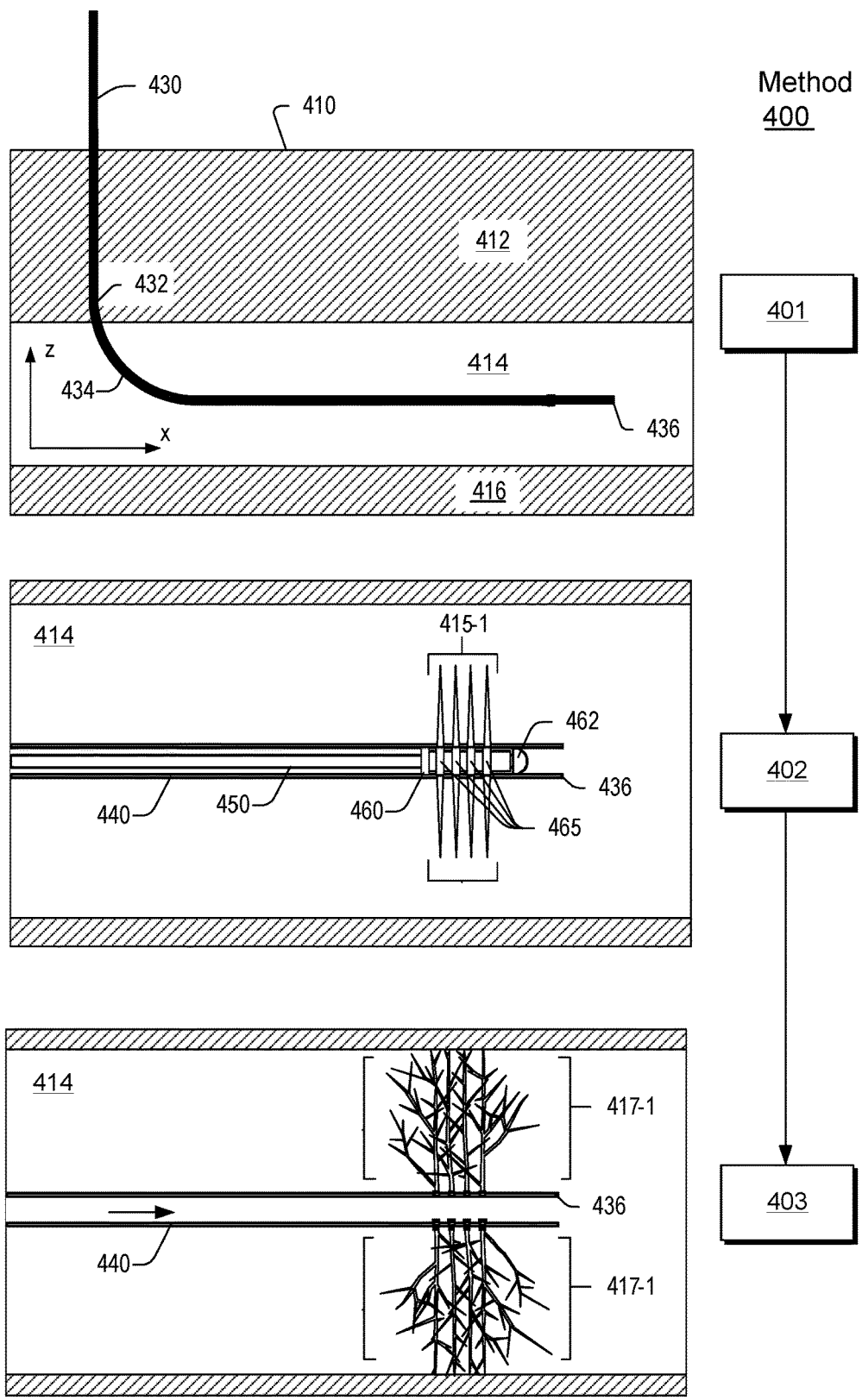
FIG. 4 illustrates an example of a portion of a method.
Figure 5:
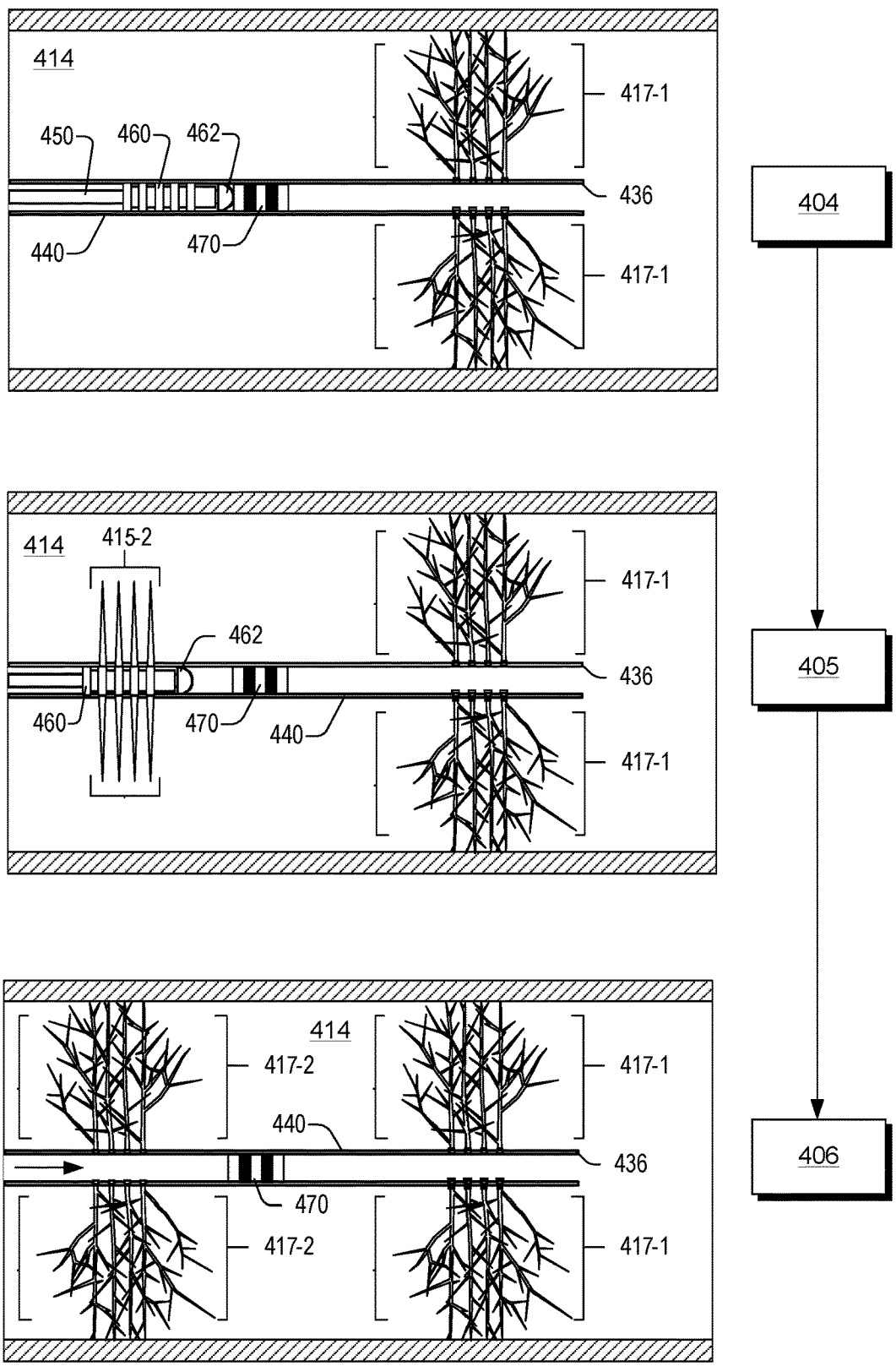
FIG. 5 illustrates an example of a portion of the method of FIG. 4.

FIGS. 4 and 5 show an example of a method 400 that includes generating fractures. As shown, the method 400 can include various operational blocks such as one or more of the blocks 401, 402, 403, 404, 405 and 406. The block 401 may be a drilling block that includes drilling into a formation 410 that includes layers 412, 414 and 416 to form a bore 430 with a kickoff 432 to a portion defined by a heel 434 and a toe 436, for example, within the layer 414.

As illustrated with respect to the block 402, the bore 430 may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, per the block 403, fluid may be introduced into the bore 430 between the heel 434 and the toe 436 where the fluid passes through the perforations in the casing 440 and into the channels 415-1. Where such fluid is under pressure, the pressure may be sufficient to fracture the layer 414, for example, to form fractures 417-1. In the block 403, the fractures 417-1 may be first stage fractures, for example, of a multistage fracturing operation.

Per the block 404, additional operations are performed for further fracturing of the layer 414. For example, a plug 470 may be introduced into the bore 430 between the heel 434 and the toe 436 and positioned, for example, in a region between first stage perforations of the casing 440 and the heel 434. Per the block 405, the perforator 460 may be activated to form additional perforations in the casing 440 (e.g., second stage perforations) as well as channels 415-2 in the layer 414 (e.g., second stage channels). Per the block 406, fluid may be introduced while the plug 470 is disposed in the bore 430, for example, to isolate a portion of the bore 430 such that fluid pressure may build to a level sufficient to form fractures 417-2 in the layer 414 (e.g., second stage fractures).

In a method such as the method 400 of FIGS. 4 and 5, it may be desirable that a plug (e.g., the plug 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

Figure 6:
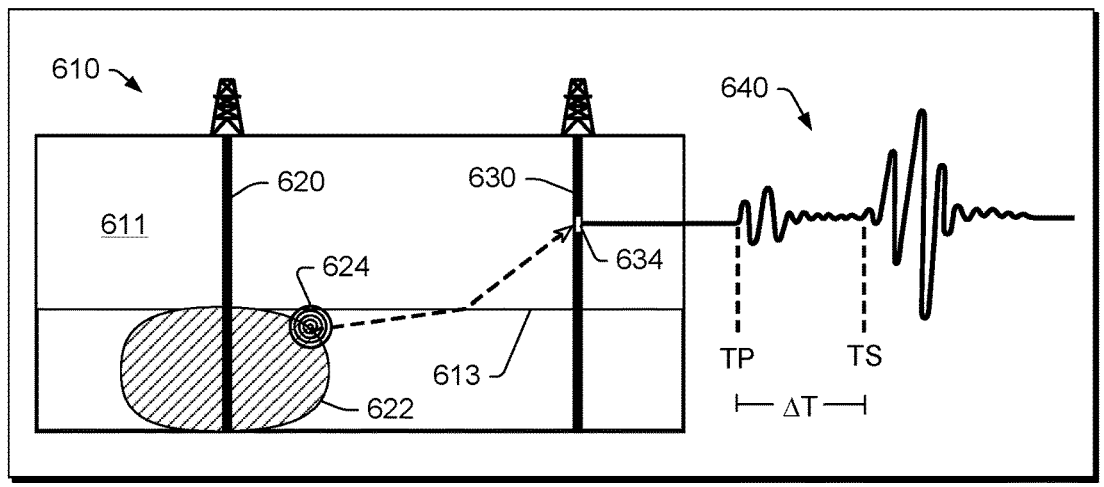
FIG. 6 illustrates examples of techniques and equipment associated with microseismicity.
Figure 6:
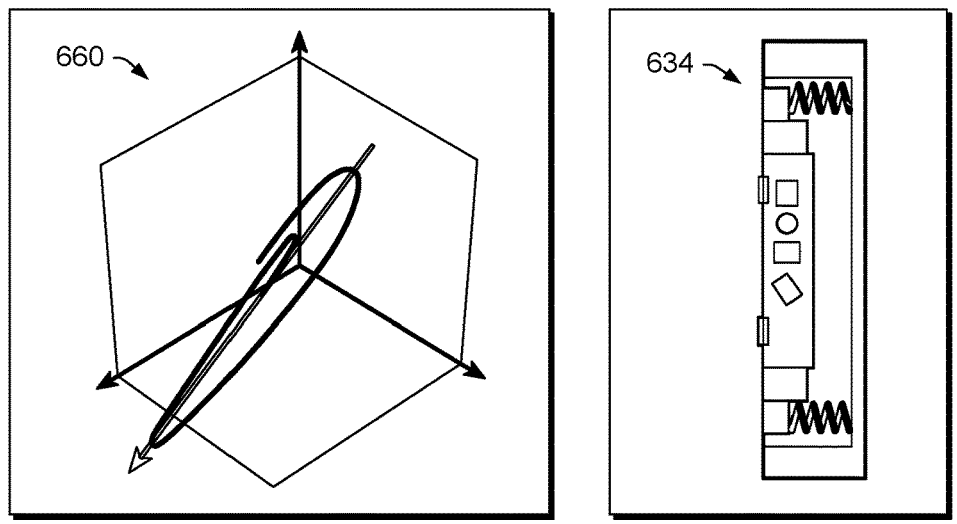
Figure 6:
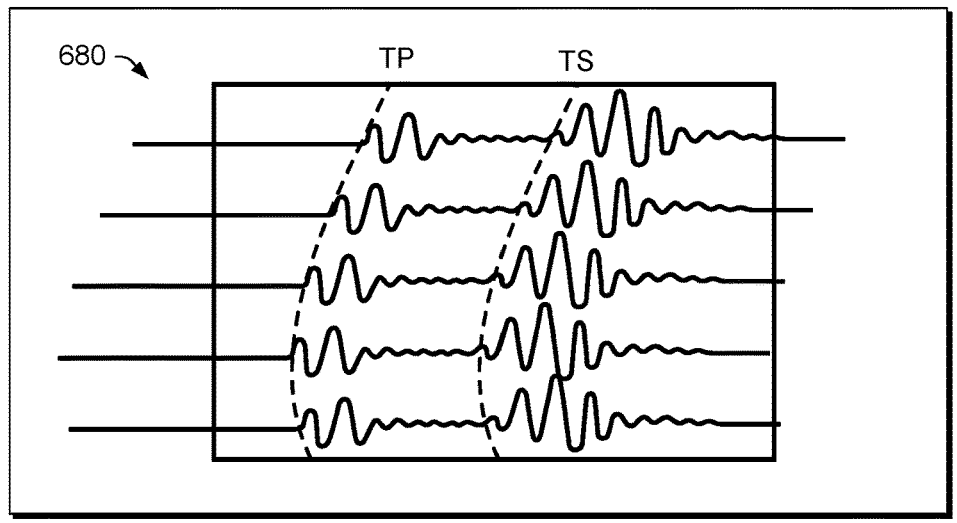

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy of a microseismic event may travel through a portion of the geologic environment 611, optionally interacting with one or more reflectors 613, and pass to the monitoring bore 630 where at least a portion of the energy may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

Sensed energy may be analyzed, for example, to determine one or more of distance and azimuth from a sensor to a source of an elastic wave emission and depth of a source of an elastic wave emission (e.g., to determine location information, etc.). In a fracturing operation, a source of an elastic wave emission may be registered as an event, which can include a time, a location and one or more acquired signals (e.g., traces). Information associated with an event may be analyzed to determine one or more of location and magnitude.

As an example, distance (d) to an event may be derived by measuring a time difference ($\Delta T$) between arrival times for a P-wave (TP) and an S-wave (TS). The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

Azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during multistage fracture treatments may provide disperse "clouds" of events (e.g., located at individual event hypocenters). As an example, a method can include analyzing clouds of events to extract planar-type features, which may be indicative of fracture location, directions of stresses, etc.

Effectiveness of hydro-fracturing, as a stimulation method, can depend on multiple variables and competing effects. For instance, a hydraulic fracture, or stage-fracture, may be expected to propagate deeply into a pay zone and increase surface area through which hydrocarbons can be drained from a formation to a well. As to predicting behavior, for example, via modeling, various variables (e.g., local stress, natural fracture network, injection rate, fluid viscosity, etc.) can act together to determine the size, orientation, aperture and geometry of the resulting stage-fracture values, for such variables may be not be known a priori, may be known with some uncertainty, etc.

During creation or propagation, a hydraulic fracture introduces changes in a stress field around it. For example, an increase in the minimum horizontal stress, $S_{hmin}$ (e.g., "stress shadow effect"), can affect pressure to open a fracture (e.g., a subsequent fracture) and its shape, thus potentially affecting in a negative way effectiveness of a hydraulic-fracturing job. On the other hand, these stress changes may also "reactivate" pre-existing natural fractures thorough phenomena such as shearing and dilatation, which potentially could have a positive effect of increasing permeability within an Estimated Stimulation Volume (ESV). As an example, a stimulation process may reactivate a number of natural fractures to increase permeability within a region of interest, which may be, post-stimulation, an ESV. As an example, a natural fracture may be considered to be active at some time or times during its existence and may be considered to be reactivated in response to an intervention such as a stimulation treatment (e.g., hydraulic fracturing, etc.).

Stress shadows, microseismicity, stimulated rock volume and production tend to be related in a complex manner. It may be desirable to understand better such processes, for example, to help predict magnitude and consequences of a stress shadow and ESV. As an example, a method may include establishing one or more linkages between fracture geometry, microseismicity, stress shadow, ESV and permeability.

As an example, a method can include defining total reactivated fracture volume (RFV) in a manner where it may be estimated by calculations based at least in part on an elasto-plastic solution to a problem of opening and shearing of one or more fractures under given stress conditions. Such an approach can establish one or more links between factors such as, for example, dynamic stress changes, micro-seismic activity, effective changes in fracture aperture, and permeability. As an example, a method may be a workflow that may include worksteps. As an example, a method can include receiving input information from a multidimensional mechanical earth model (e.g., consider a 3D MEM) and receiving input information as to fracture geometry (e.g., consider geometry of a discrete fracture network (DFN)). In such an example, the method may be formulated numerically where one or more numerical techniques may be applied to solve equations for output values (e.g., results). As an example, starting from a 3D MEM and guidelines on fracture geometry, a numerical solution may be output for permeability enhancements, microseismicity and RFV.

Microseismic monitoring can be utilized for evaluating effectiveness of reservoir stimulation, for example, in unconventional reservoirs. As an example, results of microseismic monitoring of hydraulic fractures can allow engineers to understand better various aspects of one or more of fracture networks, production, and geohazards (e.g., fracturing induced water production from adjacent formations or fault-related fluid loss). Microseismic results can be integrated with and used to calibrate a mechanical earth model (MEM) and/or a fracture model, which may be used, for example, to predict fracture geometry and conductivity from stimulation operations. As an example, real-time microseismic monitoring can facilitate making of timely decisions, which may, for example, help to reduce or prevent problems such as those related to geohazards, treatment overlap, poor coverage of the formation, poor cement, or completion hardware failure.

Microseismic monitoring can aim to provide event locations with a desired amount of accuracy as to such locations. A desired amount of accuracy may depend on various factors such as, for example, equipment available, offset wells available, etc. Accuracy and precision of microseismic results can depend on various factors such as, for example, quality of microseismic signals, suitability of survey geometry, accuracy of treatment and monitor wellbore locations, accuracy of a velocity model, and/or workflow used to map microseismic events. Various aspects of a velocity model can influence accuracy of mapped hypocenter locations. For example, an inaccurate velocity model can result in location errors of the order of hundreds of feet (e.g., 30 meters or more).

A velocity model can account for how seismic energy travels within a geologic environment. Velocity, as a property of a geologic environment, can be a medium-distance divided by a traveltime of seismic energy. Velocity can be determined via one or more techniques (e.g., laboratory measurements, acoustic logs, vertical seismic profiles, velocity analysis of seismic data, etc.). Velocity may vary vertically, laterally and azimuthally in anisotropic media such as rocks; noting that velocity tends to increase with depth in the Earth because compaction reduces porosity. Velocity may vary as a function of how it is derived from data. For example, stacking velocity derived from normal moveout (NMO) measurements of common depth point (CDP) gathers can differ from the average velocity measured vertically from a check-shot or vertical seismic profile (VSP). In a homogeneous medium, velocity would be expected to be the same, regardless of direction. Various techniques can determine velocity in one or more types of anisotropic medium or media of a geologic environment, which may be a basis or bases for a velocity model or velocity models.

In seismology, seismic data, vertical seismic profiles and/or well log data may be used to perform an inversion that can generate a model as a result where the model can model layers, for example, including their thickness (e.g., h), density (e.g., p) and P- and S-wave velocities (e.g., Vp and Vs or $V_{SH}$ and $V_{SV}$).

As an example, a method can include surface wave analysis (SWA). For example, a method may include SWA modeling and inversion (SWAMI). As an example, a framework may be provided that can perform SWA associated calculations (e.g., SWAMI calculations).

As an example, consider the SWAMI velocity modeling framework marketed by Schlumberger Limited (Houston, Texas), which may optionally be utilized at least in part with one or more other frameworks (e.g., PETREL®, OCEAN™, OMEGA™, etc.). The SWAMI framework includes an inversion module that allows measurements from analysis of surface waves to be converted into a near-surface velocity model. Such a velocity model may be added to geological information and geophysical measurements to provide a more accurate representation of the near-surface structure. Such a framework may be utilized, for example, to initiate tomographic analysis, for example, as part of a prestack depth migration process.

As an example, a method can include modeling and inversion. For example, information may be acquired in a geologic environment and analyzed to characterize at least a portion of the geologic environment as including various types of material (e.g., media such as rocks.). As an example, a method can include acquiring data (e.g., or receiving data), which may be rendered as time with respect to offset (e.g., distance), can include data processing, which may include generating phase velocity versus wavelength data (e.g., a relationship between phase velocity and wavelength) and can include performing an inversion (e.g., inverting), which may include generating a relationship between velocity and depth. Velocity may vary with respect to depth, for example, where velocity may generally increase with respect to depth and where in a near surface region a relationship or relationships between velocity and depth may differ from those at greater depths. As an example, in a graphical form, a velocity model may be presented as velocity versus depth. As an example, where a medium is anisotropic, a velocity model may optionally account for anisotropy and may be presented as a multidimensional model, which graphically may be, for example, a graphic represented with respect to three axes.

As survey design and event location workflows may be limited in flexibility, as an example, a method can include enhancing a velocity model. Such a method can include processing information that can enhance accuracy in an effort to help minimize uncertainty associated with one or more mapped event locations.

Microseismic monitoring results can be generated via use of a velocity model. As an example, a velocity model may be based on vertical velocities derived from sonic logs and, for example, one or more known-location source shots to orient geophones and calibrate the velocity model for anisotropy.

One type of isotropy is referred to as vertical transverse isotropy (VTI) or transverse isotropy (TI), which includes an axis of rotational symmetry (e.g., vertical or another direction). As an example, for VTI, in layered rocks, properties can be substantially uniform horizontally within a layer, but vary vertically and from layer to layer. Velocity model calibration can aim to account for at least some amount of TI, for example, consider accounting for VTI as may exist in unconventional shales. Another type of TI is horizontal transverse isotropy (HTI). As an example, velocity model calibration may aim to account for at least some amount of HTI where a series of shots are available at variable azimuths.

As an example, for VTI, anisotropy can be modeled by adding Thomsen anisotropy parameters epsilon, delta, and gamma until modeled arrival times fit observed arrival times for calibration shots. In such an example, accuracy of the calibrated model may be further verified if the modeled calibration shot locations match their expected locations.

Various parameters may be used to characterize anisotropy, which can include one or more of the Thomsen parameters $\epsilon$, $\delta$ and $\gamma$ (see, e.g., Thomsen, "Weak elastic anisotropy", Geophysics, Vol. 51, No. 10, pp. 1954-1966, October 1986). The Thomsen parameter $\delta$ can describe offset effects (e.g., short offset). As to the Thomsen parameter $\epsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave. The Thomsen parameters $\epsilon$ and $\gamma$ may be estimated from wave data while estimation of the Thomsen parameter $\delta$ involves access to additional information. As noted by Thomsen (1986), the parameter $\delta$ controls most anisotropic phenomena of a medium of interest in geophysics, some phenomena of which are non-negligible even when anisotropy is considered to be weak. Thomsen (1986) presents the following velocity equations (e.g., velocity model equations) for weak anisotropy and normal moveout (NMO), listed below for P-wave, SV-wave and SH-wave:

$$V_{NMO}(P) = \alpha_0(1+\delta)$$

$$V_{NMO}(SV) = \beta_0(1+(\alpha_0^2/\beta_0^2)(\epsilon-\delta))$$

$$V_{NMO}(SH) = \beta_0(1+\gamma)$$

where $\alpha_0$ is the vertical P wave velocity (e.g., $\sim(C_{33}/\rho)^{0.5}$) and where $\beta_0$ is the vertical S wave velocity (e.g., $\sim(C_{44}/\rho)^{0.5}$).

As illustrated in the examples of FIGS. 4 and 5, hydraulic fracturing may be performed via horizontal completions. Horizontal completions stem from horizontal drilling, which can be a subset of directional drilling. As an example, horizontal drilling may be classified based on departure of a bore from vertical, for example, where the bore exceeds about 80 degrees. In some instances, after reaching a portion at about 90 degrees (horizontal), drilling of the bore may optionally occur in a slight upward manner. In such cases, the angle past 90 degrees may be continued (e.g., as in about 95 degrees); rather than reporting it as deviation from vertical (e.g., which would be about 85 degrees). As a horizontal well may penetrates a greater length of a reservoir, it may offer production improvement over a vertical well.

As to microseismic monitoring, as explained with respect to FIG. 6, geophones may be positioned in an offset well, which may be, for example, a lateral well (e.g., an offset horizontal well that is offset to a well in which stimulation is being applied). As an example, a source of uncertainty in such an example can be that the depths of calibration are somewhat limited.

As an example, monitoring can include positioning equipment in one or more wells where such equipment may be positioned via wireline or other type of line, cable, coil, etc. In various monitoring operations, equipment is moved up a bore to various positions (e.g., TP1 as a most distal to TPN as a most proximate to a surface opening of a bore). As an example, a source may deliver both P-wave and S-wave energy via delivery in one or more axes.

As an example, various types of equipment may be utilized in a field operation. For example, consider sliding sleeve completions or coiled tubing triggered systems. As an example, a completion technique may be of a type that does not have perforations. As to sliding sleeves, balls can be dropped to isolate each subsequent stage of a series of stages where such ball-seating events can be somewhat difficult to identify in real-time without pumping pressure data. As an example, a sliding sleeve completions approach may utilize a coiled tubing triggered system, which may not create a known-location seismic source(s).

As an example, a method for seismic monitoring can include leveraging a downhole controlled source that pulses (e.g., fires) at controlled (i) time and (ii) depth and with a (iii) controlled radiation pattern within a (iv) controlled frequency range. In such an example, acquired data can be utilized to refine an initial log-derived velocity model for microseismic monitoring, which may be real-time seismic monitoring.

As an example, velocity model calibration may be performed based on perforation shots along a treatment well for an individual stage of stimulation. Perforation shots can provide representations of raypaths between microseismic events and monitoring geophones. Where perforation shots are not available, other options may be available such as, for example, string shots in an adjacent well, ball-seating events in sliding-sleeve completions, a vibrator source at the surface, and an early treatment event. As an example, a method can include utilizing one or more types of seismic data for microseismic monitoring.

As an example, microseismic monitoring can include velocity model calibration using perforation shots, string shots, surface shots, and/or first events by making use of a downhole controlled source that pulses (e.g., fires) at a controlled (i) time and (ii) depth, and with a (iii) controlled radiation pattern within a (iv) controlled frequency range where data acquired may be utilized to refine an initial log-derived velocity model.

As an example, a refined calibrated velocity model can allow for increased accuracy of mapped microseismic event locations (hypocenters). In such an example, one or more locations can optionally be analyzed as part of a workflow for real-time decision making, fracture geometry estimates, and/or model integration. As to real-time, such a term can include processing times and transmission times for information (e.g., data). As an example, real-time may be of the order of a few minutes. For example, via use of a refined velocity model in the form of stored information (e.g., stored in memory of a storage device), a microseismic event may be located in a time period that is of the order of a few minutes after acquisition of seismic energy associated with the microseismic event. In such an example, the refined velocity mode (e.g., as stored information) can be a velocity model that is based at least in part on seismic energy generated by a controlled source; such an approach may be referred to as a velocity model calibration technique (e.g., a controlled source velocity calibration (CSVC) technique).

As an example, a CSVC approach may provide for robust calibration source (e.g., where perforations may not be available), may provide for improvement over perforation shots due to a more accurate time of origin signal (e.g., T0 as a signal origin time), may provide a directional source to reliably generate P and/or S phases (e.g., optionally on request), may provide more suitable coverage than provided by vibrator (e.g., vibe) and string shot sources, and/or may provide more flexibility in depth coverage compared to one or more other techniques alone (e.g., consider >>>vibe, >>string shot, >perforations), as may depend on survey/well configuration. As an example, a CSVC approach may provide an ability to capture data over a wider depth range for horizontal arrays and/or may provide a finer resolution due to flexible receiver and source spacing, which may be tailored to focus on a specific zone of interest. As an example, where desired, a layer-by-layer calibration approach may be implemented with a relatively small amount of advanced planning.

As an example, stimulation can include hydraulic fracturing, which can include perforating. As an example, stimulation can include steam flooding. As an example, stimulation may alter velocity in a formation. As an example, a method can include performing crosswell monitoring with respect to one or more types of stimulations.

Figure 7:
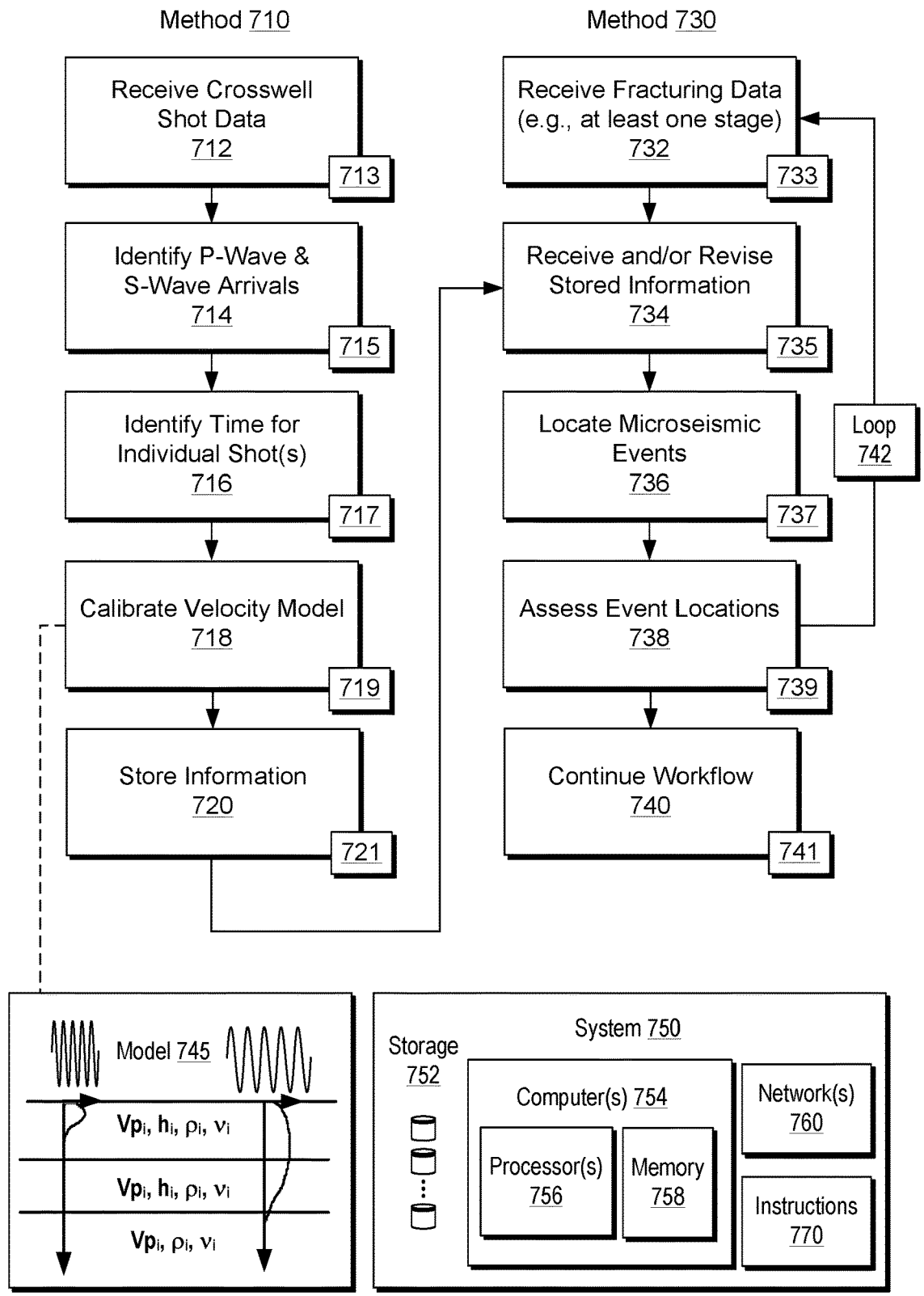
FIG. 7 illustrates an example of a method, an example of a model and an example of a system.

FIG. 7 shows examples of method 710 and 730, an approximated example of a velocity model 745 and an example of a system 750. As shown, the method 710 includes a reception block 712 for receiving crosswell shot data, an identification block 714 for identifying P-wave and S-wave arrivals (e.g., SH and/or SV), an identification block 716 for identifying time or times of one or more individual shots (e.g., which may be origin times that may be associated with controlled shots), a calibration block 718 for calibrating a velocity model (e.g., refining an initial velocity model), and a storage block 720 for storing information based at least in part on the calibrated velocity model. As to the identification block 714 and the calibration block 718, a velocity model can provide for modeling of P and S velocities.

As shown in FIG. 7, the method 730 includes a reception block 732 for receiving fracturing data (e.g., sensed microseismic signals), a reception block 734 for receiving at least a portion of the stored information and/or revising the stored information based at least in part on a portion of the fracturing data (e.g., generating new information), a location block 736 for locating one or more microseismic events based at least in part on the received fracturing data and the at least a portion of the stored information, an assessment block 738 for assessing the one or more microseismic event locations and an optional continuation block 740 for continuing a workflow. For example, a workflow may include one or more actions associated with stimulation, production, reporting, etc.

As shown in the example of FIG. 7, the method 730 can include looping per a loop block 742, for example, to receive data and/or process data for one or more additional stages of a multistage stimulation.

As an example, a workflow can include modeling stimulation, for example, via a framework such as the MANGROVE™ framework (Schlumberger Limited, Houston, Texas). As an example, a workflow can include executing a framework such as, for example, the MISTRAL™ framework (Schlumberger Limited, Houston, Texas).

As an example, the storage block 720 may store information in the form of a look-up table (LUT) and/or in one or more other forms (e.g., as a data structure). As an example, the reception block 734 may include receiving information from a LUT and/or one or more other types of data structures. As an example, the reception block 734 can include revising the stored information, for example, by generating revised information, which may include new information based at least in part on a portion of the received data of the reception block 732. For example, information may be revised and/or generated based on data acquired during a fracturing operation (e.g., hydraulic fracturing).

As an example, the method 730 can include making one or more calls to a system that can access the stored information and that can return information germane to locating one or more microseismic events. As an example, the stored information may be loadable in memory of a computing system such that the information can be received (e.g., loaded) and then accessed from memory during performance of the method 730 where one or more loops may exist as to handling of data to locate one or more microseismic events. As an example, the stored information may be in the form of one or more models with various model parameter values determined via the calibration block 718. In such an example, received information may be based at least in part on one or more of the one or more models. As an example, one or more models and associated parameter values may be loaded into memory of a computing system such that the parameter values are received (e.g., loaded) and then utilized in a model-based approach during performance of the method 730 to locate one or more microseismic events. As mentioned, the method 730 can include revising information based at least in part on data acquired during a fracturing operation (e.g., a stimulation operation, which may be a treatment operation).

The methods 710 and 730 may be associated with various computer-readable storage media (CRM) blocks 713, 715, 717, 719, 721, 733, 735, 737, 739 and 741. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 710 and/or the method 730. As an example, a computer-readable medium (CRM) may be a computer-readable storage medium. A computer-readable storage medium is not a carrier wave, is not a signal and is non-transitory.

As shown in FIG. 7, a velocity model 745 can account for one or more layers of a geologic environment (e.g., one or more types of media). As an example, a velocity model may account for anisotropy and/or one or more types of symmetry (e.g., TI medium). As an example, a velocity model can include one or more equations (see, e.g., equations such as the weak anisotropy equations given by Thomsen).

As shown in FIG. 7, a system 750 may include one or more information storage devices 752, one or more computers 754, one or more network interfaces 760 and instructions 770. As to the one or more computers 754, each computer may include one or more processors (e.g., or processing cores) 756 and memory 758 for storing instructions (e.g., the instructions 770), for example, executable by at least one of the one or more processors 756. As an example, a computer may include one or more network interfaces (e.g., wired or wireless), one or more graphics cards, a display interface (e.g., wired or wireless), etc. As an example, the system 750 may be configured to perform one or more methods. As an example, one or more features of the system 750 may be implemented to perform one or more portions of the method 710 and/or one or more portions of the method 730.

Figure 8:
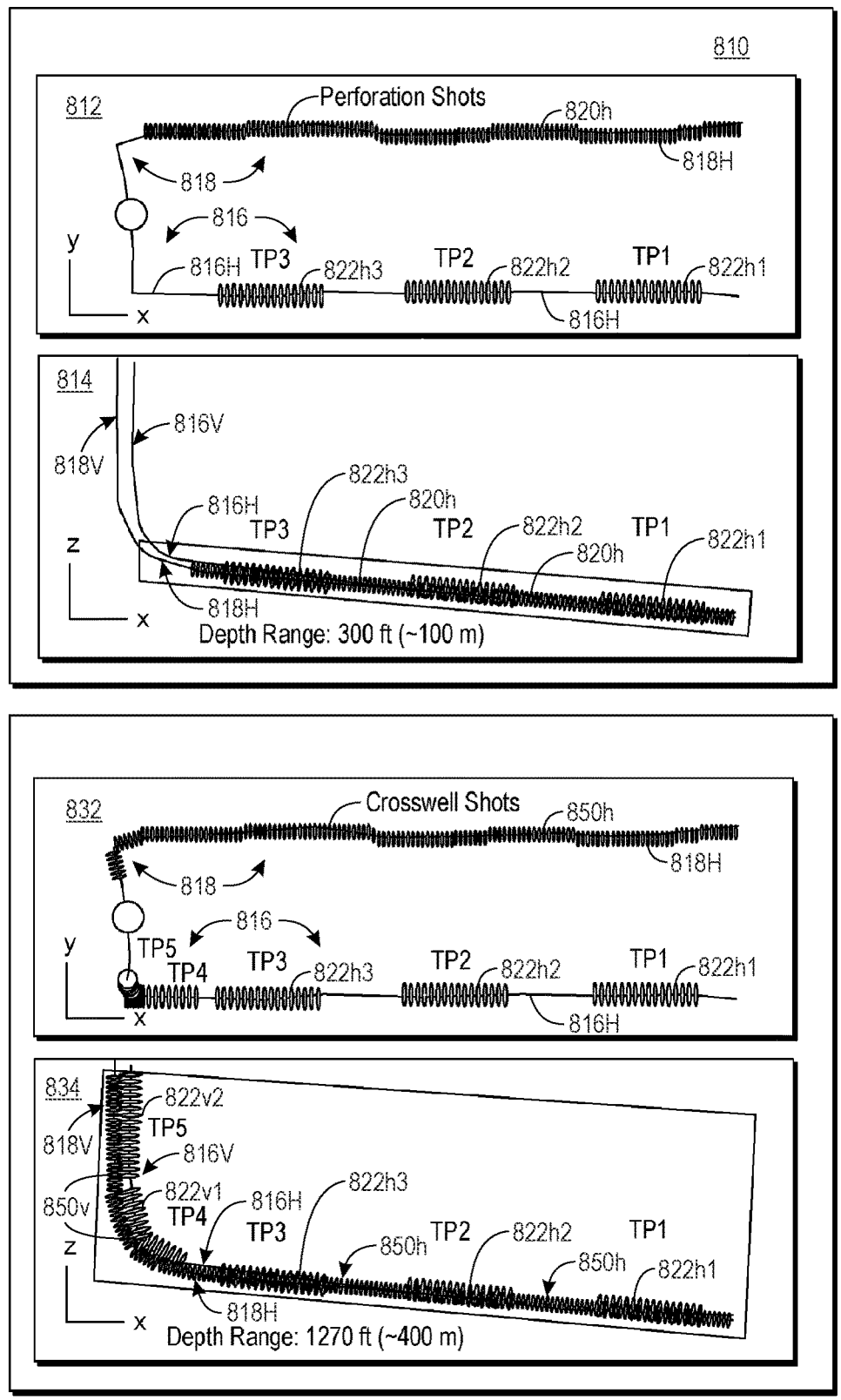
FIG. 8 illustrates examples of plots.

FIG. 8 shows sets of example plots 810 (including a top view 812 along z direction and a side view 814 along y direction) and 830 (including a top view 832 along z direction and a side view 834 along y direction) for a geologic environment that includes a monitoring well 816 and a stimulation well 818 (e.g., a treatment well). As shown, operations associated with the plots 810 include positioning one or more tools (e.g., 822h1, 822h2, and 822h3) in a horizontal portion 816H of the monitoring well 816 to acquire information associated with perforation shots 820h positioned along a horizontal section 818H of the stimulation well 818; whereas, operations associated with the plots 830 include positioning the one or more tools (e.g., 822h1, 822h2, and 822h3) in the horizontal section 816H and the one or more tools (e.g., 822v1, and 822v2) in a vertical section 816V of the monitoring well 816 to acquire information associated with crosswell shots 850h positioned along the horizontal section 818H and the crosswell shots 850v positioned along the vertical section 816V using a controlled crosswell shot source. As indicated, the depth range as shown in the side view 814) of the operations in the plots 810 is about 300 ft (e.g., about 100 meters); whereas, the depth range as shown in the side view 844) of the operations in the plots 830 is about 1270 ft (e.g., about 400 meters).

As shown, a method can include increasing depth coverage for horizontal monitoring and treatment well configuration. Again, the plots 810 show a setup with perforations where the monitor and treatment wells 816 and 818 are located at a similar depth. In such a case, the depths across which the velocity model can be calibrated are limited by the range of perforations as may be expected to be positioned within a layer of a reservoir (e.g., shale reservoir). In the example operations of the plots 810, the vertical depth range is approximately 300 ft (e.g., about 100 m); however, the portion of the velocity model is even smaller due to the wells following dipping beds. In contrast, in the example operations of the plots 830, the vertical depth range that can be calibrated is increased to nearly about 1000 ft (e.g., about 300 m) due to the ability to place crosswell source shots (e.g., the crosswell shots 850v) and receivers (e.g., the 822v1 and 822v2) in the vertical sections 818V and 816V of the treatment and monitoring wells 818 and 816, respectively. In example operations of the plots 830, the receivers and crosswell source shots have about 50 ft (e.g., about 15 m) spacing in the vertical sections 818V and 816V of the treatment and monitoring wells 818 and 816, respectively.

Figure 9:
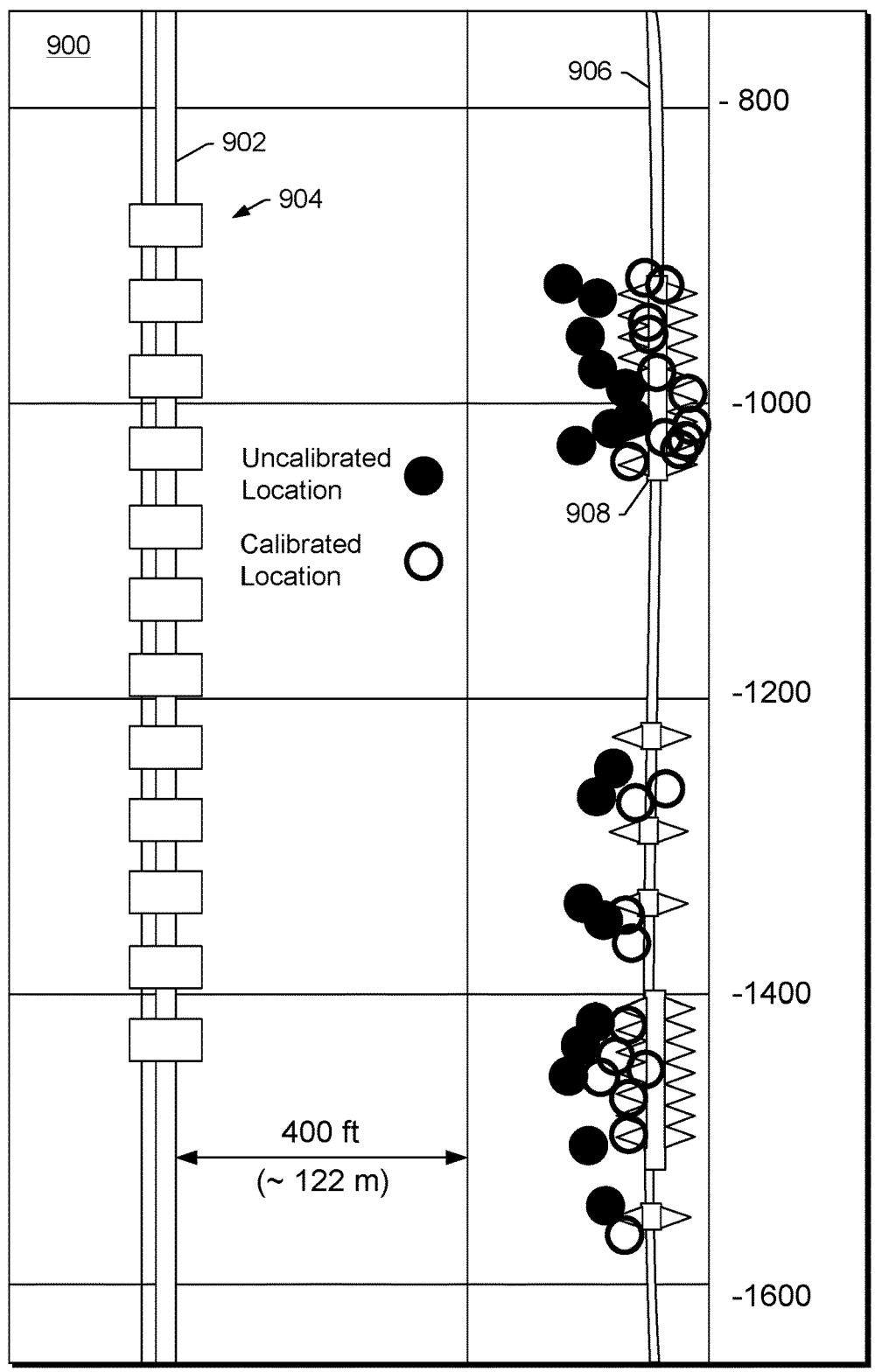
FIG. 9 illustrates an example of a plot.

FIG. 9 shows an example plot 900 of an arrangement of a monitoring well 902 and a stimulation well 906 (e.g., a treatment well) where a receiver array 904 is positioned in the monitoring well 902, where perforation locations 908 are indicated in the stimulation well 906 and where uncalibrated event locations (filled circles) and calibrated event locations (open circles) are shown. In such an example, the calibrated event locations are calibrated using crosswell source information.

Thus, the example shown in the plots 830 can increase depth coverage and provide for a reduction in source spacing for a vertical treatment and monitor well configuration. As an example, crosswell sources may be spaced at about 20 ft (e.g., about 7 m); whereas, perforations may be expected to have variable spacing, for example, with one or more relatively large gaps between adjacent perforation shots. As an example, perforations can be monitored from a particular tool position; whereas, crosswell shots may be monitored from tool positions (e.g., a plurality of tool positions), which can allow for greater depth coverage as to velocity model calibration. As an example, a depth offset between crosswell shots and tools can be selected to account for formation dip.

As an example, a workflow may proceed as follows:
Prior to job:
1. Project setup
2. Crosswell survey planning
Immediately prior to real-time:
1. Add crosswell shot data to project
2. Add a new stage to the survey
   a. Input shot depths
3. Receiver orientation
   a. Detect crosswell shots and pick P-wave arrivals
   b. Select subset of shots (e.g., depends on project)
   e. QC P-wave arrival picks
   d. Orient receivers
Repeat 1, 2 and 3 for each crosswell (CW) fan
4. Velocity model calibration
   a. Pick SH-wave arrivals (and SV-wave arrivals, if clear)
   b. Pick TO time ($T_0$) for each shot
   c. Calibrate velocity model
   d. Generate information (e.g., lookup table, etc.)
   e. Locate crosswell shots
   f. QC P-wave and S-wave picks
      re-pick and re-locate if desired
   g. If locations are acceptable, continue
      if not, redo calibration 5. Orient tools using vibe or other source In real-time:

6. Process a fracturing stage
   a. Generate new information (e.g., a new lookup table)
   b. Locate fracturing events (e.g., microseismic events)
   c. QC events, re-pick and re-locate if necessary As an example, a workflow or workflows may be performed in a tiered manner. For example, a first tier may be a real-time tier that includes a few stations with the source, used in a one-dimensional manner. Such a tier may be implemented when a velocity calibration method may not be readily available. As an example, a second tier may optionally be a real-time tier. Such a tier can include several stations in 1D, for example, as to a complex formation where perforation shots might not be sufficient to derive a proper velocity model. As an example, a third tier can be an off-line tier where, for example, acquisition may be planned over a day or days before a fracturing operation. As an example, such a tier may be performed for a complex formation/structure/geology that can benefit from a high-resolution velocity model (2D/3D).

As an example, as to a first tier, such a tier can include real-time microseismic monitoring where crosswell measurements can be taken prior to a fracture treatment and used to calibrate a velocity model for real-time event locations. In such an example, the tier may provide a versatile calibration source in cases where no perforation shots are available or other calibration sources are suboptimal and/or may extend depth coverage for velocity model calibration in a horizontal monitoring configuration. In such instances, using crosswell sources can provide a means to reduce uncertainty in the velocity model and improve subsequent event location accuracy.

As an example, sources used in crosswell surveys can be used for microseismic monitoring and can be types of sources that can be triggered at known locations and create acoustic signals within the rock that are recorded at the receiver array. Such sources can provide information for calibrating a velocity model used in microseismic monitoring.

As an example, a controlled or controllable source can be an omnidirectional source. As an example, a controlled or controllable source can be a piezoelectric type of source or can be a sparker type of source. As an example, a controlled or controllable source can be a directional source. As an example, a controlled or controllable source can include one or more features of the DEEPLOOK-CS™ source (Schlumberger Limited, Houston, Texas). For example, consider a piezoelectric source that can emit seismic energy over one or more frequencies as may be selected from a range of frequencies (e.g., from about 100 Hz to about 2,000 Hz).

As an example, a treatment well may be utilized as a seismic source well prior to performing fracturing. For example, a monitoring well may include receivers where seismic sources are positioned in a treatment well prior to one or more treatment operations. As an example, a well may include one or more sources and one or more receivers (e.g., a source and a receiver in a common well).

As mentioned, calibration can account for vertical transverse isotropy (VTI) and may also account for horizontal transverse isotropy (HTI) where, for example, a series of shots are available at variable azimuths. As an example, anisotropy can be modeled by adding Thomsen anisotropy parameters epsilon, delta, and gamma (Thomsen, 1986) until (1) modeled arrival times fit observed arrival times for calibration shots and (2) modeled locations for calibration shots align well with their expected locations.

As an example, a method can implement one or more different calibration methods to model anisotropy. For example, consider using one or more of: (1) inversion for homogeneous anisotropy (e.g., single values across all depths); (2) inversion for variable anisotropy scaled by 1/Vp; and (3) manual selection of layers and application of variable anisotropy.

In a trial, a first dataset provided for comparing velocity model calibrations based on crosswell sources to another method based on perforations (e.g., perforation shots). For a second dataset, for which no perforation shots were available, use of crosswell sources for calibration in a horizontal monitor well scenario is shown with enhancement of microseismic event locations. Accuracy of a velocity model can be assessed by measuring the modeled offsets of the calibration sources (e.g., perforations and crosswell shots) from their expected locations.

As mentioned, the first dataset allowed for a comparison of accuracy of events located with a velocity model calibrated with perforations (perforation shots) to accuracy of events located with a model calibrated with crosswell sources in a project containing a vertical treatment well and a vertical monitor well, for example, as shown in FIG. 9.

As illustrated in FIG. 9, a crosswell source-derived model calibration reduced the average offset of perforations by nearly half that of the uncalibrated model (from about 78 ft (e.g., about 25 m) to about 45 ft (e.g., about 15 m)). In this example, relatively little variability exists in the accuracy of perforation locations from models calibrated with the crosswell shots versus those calibrated with perforations, as shown in Table 1, below.

TABLE 1

Average offsets for perforation and crosswell shot locations using models without calibration, calibrated with perforations, and calibrated with crosswell (CW) sources. For the calibrated models, anisotropy was modeled either by single Thomsen parameter values across all depths or by variable anisotropy scaled by 1/Vp.

| Calibration Type | Average Offset (ft) | Standard Deviation (ft) |
|---|---|---|
| Perforation Shots (n = 24) | | |
| No Calibration | 77.9 (~24 m) | 20.1 (~6 m) |
| Perf Based, 1/Vp | 45.5 (~14 m) | 16.4 (~5 m) |
| Perf Based, Single Value | 42.2 (~13 m) | 15.5 (~5 m) |
| CW Source Based, 1/Vp | 48.4 (~15 m) | 19.8 (~6 m) |
| CW Source Based, Single Value | 45.6 (~14 m) | 19.4 (~6 m) |
| Crosswell Shots (n = 41) | | |
| No Calibration | 67.8 (~21 m) | 27.3 (~8 m) |
| Perf Based, 1/Vp | 35.2 (~11 m) | 20.9 (~6 m) |
| Perf Based, Single Value | 38.2 (~12 m) | 22.1 (~7 m) |
| CW Source Based, 1/Vp | 39.1 (~12 m) | 20.9 (~6 m) |
| CW Source Based, Single Value | 35.5 (~11 m) | 19.1 (~6 m) |

As to the data of Table 1, the perforation shots offset range is about 42 ft to 48 ft (e.g., about 12.8 m to about 14.6 m) and the crosswell shots offset range is about 35 ft to 39 ft (e.g., about 10.6 m to about 11.9 m). The smaller offsets for the crosswell shots stems from high quality of the data; whereas, the perforation shot quality tended to be more variable, leading to inconsistency in arrival time picks.

As indicated in Table 1, the type of inversion method (single value or 1/Vp scaling) appears to have a relatively small effect on the accuracy of the shot locations for the dataset, with a single value of anisotropy across the model being slightly better for the perforation locations. Such results may be due to the relatively uniform formation velocities in the geologic environment examined.

As an example, crosswell shots can benefit a horizontal monitoring configuration. As an example, crosswell source-derived velocity models can be formed in both the horizontal and the vertical sections of a horizontal monitor well that can be used to monitor a horizontal treatment (e.g., a formation such as the Austin Chalk of the Eagle Ford).

Figure 10:
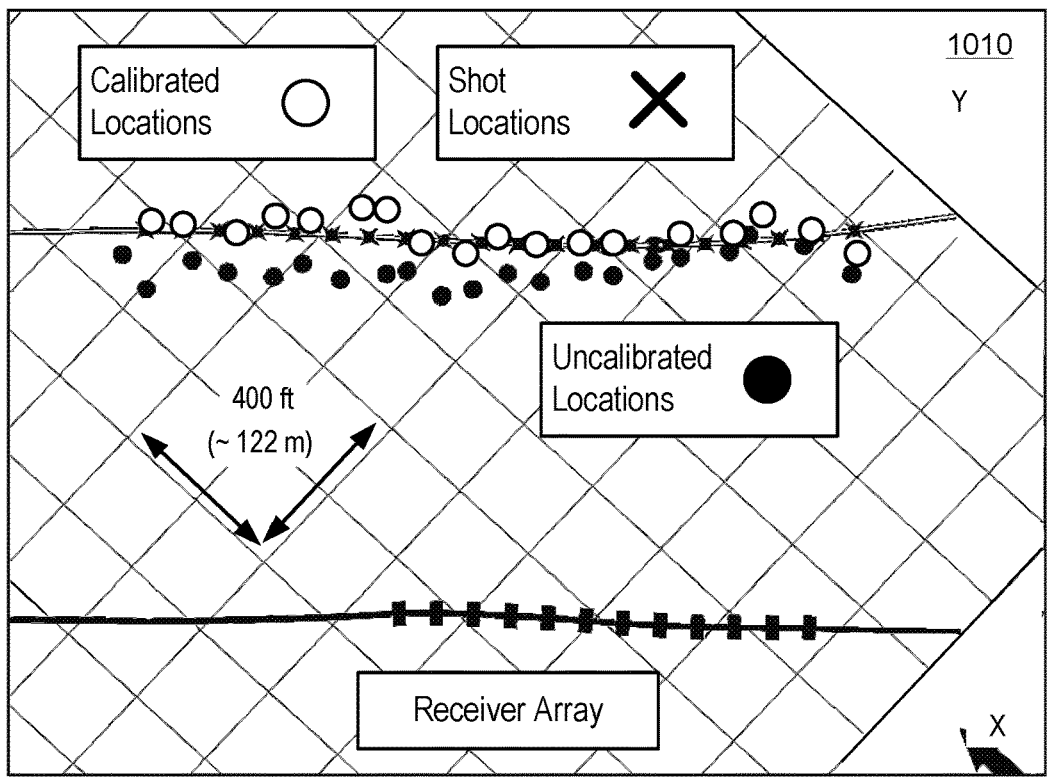
FIG. 10 illustrates examples of plots.
Figure 10:
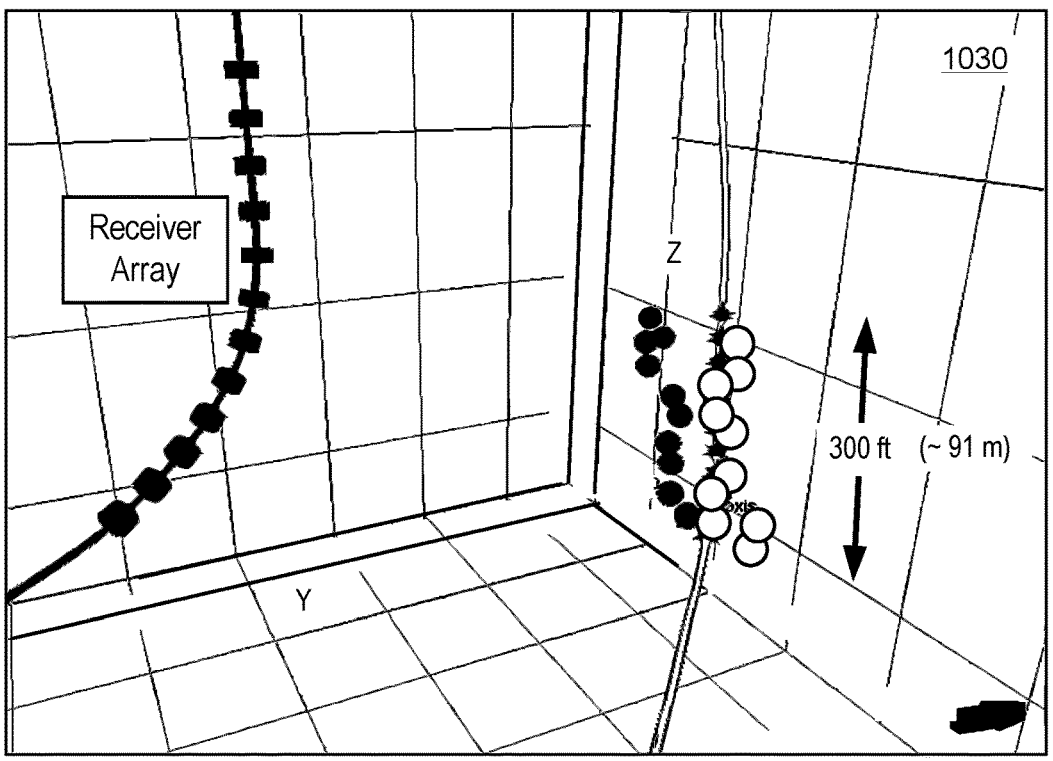

FIG. 10 shows example plots 1010 and 1030 that allow for a comparison of crosswell source shot locations using an uncalibrated model (filled circles) and a model calibrated with crosswell sources (open circles). Locations for the horizontal array as shown in the plot 1010 and the vertical array as shown in the plot 1030 demonstrated an improvement when calibrated using the crosswell sources.

Although the formation in the depth range of the laterals had relatively low anisotropy (e.g., about 0 percent to about 5 percent), a model calibrated with crosswell shots in just the lateral improved crosswell source locations compared to the locations from an isotropic model. The average offset reduced from about 116 ft (e.g., about 38 m) without calibration to about 83 ft (e.g., about 27 m) to about 102 ft (e.g., about 33 m), depending on the calibration method. Both the monitor well and treatment well laterals were at about the same depth, which limited the calibration to a narrow depth range.

The crosswell survey conducted in the heel and vertical portions of the wells indicated more anisotropy was present in layers above the laterals. As to calibration of a velocity model, shear signal from the piezoelectric source deteriorated approximately 300 ft (e.g., about 100 m) above the laterals, a depth corresponding to a very large velocity contrast, but also where the inclination of the lateral containing the source decreased to less than about 15 degrees. Poor shear may be possibly due to one or more of properties of the formation, poor treatment well conditions, or a failure of the source to generate shear while nearly vertical. Automated inversions using the crosswell shot data resulted in lesser quality shot locations when compared to use of the isotropic model. As an example, a method can include enhancing a model by using shots with good shear, for example, in the formation of FIG. 10, within about the first 300 ft (e.g., about 100 m) above the laterals for the model calibration and location comparisons.

As an example, a method can include manual calibration (e.g., selecting individual layers and applying variable anisotropy with depth), which may improve shot locations. For example, referring again to the example of FIG. 10, about 80 ft (e.g., about 26 m) average offset resulted compared to about 119 ft (e.g., about 39 m) with the uncalibrated model. Such results may be due to the properties of a formation at such depths. As an example, a method can include manual and/or automated model calibration, for example, a method can include using a manually calibrated model for better locations for controlled source shots in a heel section than when compared to models calibrated from sources in a lateral.

As an example, crosswell sources can be used for calibration of a velocity model. As an example, in a horizontal monitoring configuration, using crosswell sources in the vertical portion of the treatment well can provide calibration information for additional depth coverage in an area where fracture events are likely to occur. Results show that crosswell seismic sources are a viable option when other calibration sources are not available or when monitoring geometry limits the information available from one or more other calibration sources.

Figure 11:
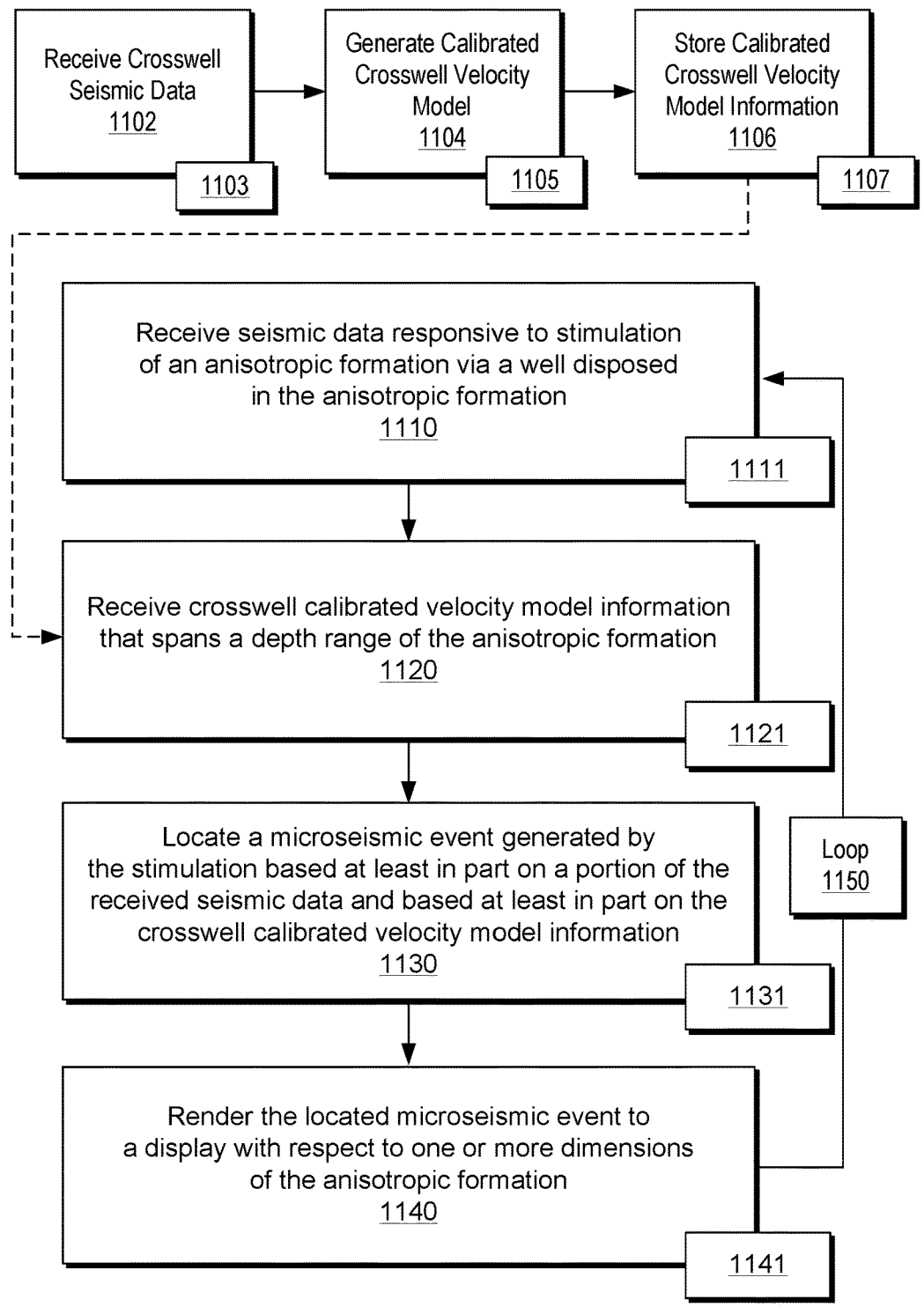
FIG. 11 illustrates an example of a method.

FIG. 11 shows an example of a method 1100 that includes a reception block 1102 for receiving crosswell seismic data associated with an anisotropic formation, a generation block 1104 for generating a calibrated crosswell velocity model and a storage block 1106 for storing calibrated crosswell velocity model information for the anisotropic formation. In such an example, the crosswell seismic data can be acquired receivers (e.g., geophones) that sense emissions generated by controlled or controllable sources. Such sources can be or include controlled or controllable direction sources.

As an example, a method can include triggering sources that are directional with controllable direction. As an example, a method can include triggering sources that emit over a frequency range where the frequency range is controllable.

As an example, a source can be of controlled directionality, controlled timing of actuation of the source (e.g., triggering, TO or $T_0$) and controlled frequency content of energy emitted by the source (e.g., frequency sweep of the energy emitted by the source).

As to calibration of a velocity model, data stemming from sources that are controllable in time (e.g., shot time), directionality (e.g., direction(s) of emission of energy) and frequency (e.g., frequency content). As an example, the frequency may be selected to boost signal to noise for a particular anisotropic formation (e.g., a reservoir region of the anisotropic formation).

In the example of FIG. 11, the method 1100 can also include a reception block 1110 for receiving seismic data responsive to stimulation of an anisotropic formation via a well disposed in the anisotropic formation; a reception block 1120 for receiving crosswell calibrated velocity model information that spans a depth range of the anisotropic formation; a location block 1130 for locating a microseismic event generated by the stimulation based at least in part on a portion of the received seismic data and based at least in part on the crosswell calibrated velocity model information; and a render block 1140 for rendering the located microseismic event to a display with respect to one or more dimensions of the anisotropic formation. As shown, a loop block 1150 may direct the method 1100 to one or more prior blocks, for example, for locating one or more additional microseismic events, optionally associated with another stage of a multi-stage stimulation.

The method 1100 may be associated with various computer-readable storage media (CRM) blocks 1103, 1105, 1107, 1111, 1121, 1131, and 1141. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 1100.

As an example, the method 1100 can include receiving crosswell microseismic data per the reception block 1102 that corresponds to sources and receivers in a substantially vertical portion of a well or substantially vertical portions of wells. In such an example, a depth range may be extended for calibration of a velocity model that can be used to locate microseismic events associated with hydraulic fracturing. For example, such events may be located at a distance from a well bore where data from vertical portion or portions can be used to calibrate a velocity model at such distances from the well bore.

As an example, a vertical well can include a lateral leg where information may be acquired for a portion of the vertical well above the lateral leg and for a portion of the vertical well below the lateral leg.

As an example, a vertical well may span a region above a lateral well and a region below a lateral well. In such an example, information may be acquired for one or more of the regions. Such information may be utilized to extend calibration of a velocity model to regions above and/or below the lateral well were hydraulic fracturing is performed using the lateral well (e.g., a horizontal well).

As an example, a method can be applied to an anisotropic formation. As an example, a crosswell calibrated velocity model can model vertical and horizontal velocities. For example, a TI model may be utilized and calibrated.

As an example, a crosswell calibrated velocity model can be calibrated based at least in part on crosswell seismic data. For example, such a calibrated model can be calibrated based at least in part on seismic data associated with one or more perforation shots (e.g., where such information may be available).

As an example, a crosswell calibrated velocity model can span a depth range in an anisotropic formation where the depth range may overlap with a depth range of expected hydraulic fractures generated in response to stimulation delivered via a well (e.g., a lateral portion of a well).

As an example, a method may be implemented at least in part via the MISTRAL® technology (Schlumberger Limited, Houston, Texas). As an example, a method may be part of a workflow that may be implemented as least in part via the PETREL® framework.

As an example, a method can include receiving seismic data responsive to stimulation of an anisotropic formation via a well disposed in the formation; receiving crosswell calibrated velocity model information that spans a depth range of the anisotropic formation; locating a microseismic event generated by the stimulation based at least in part on a portion of the received seismic data and based at least in part on the crosswell calibrated velocity model information; and rendering the located microseismic event to a display with respect to one or more dimensions of the anisotropic formation. In such an example, the method can include generating the crosswell calibrated velocity model information. For example, such generating can include controlled triggering of a source in the well where, for example, the controlled triggering of the source can include triggering of the source prior to the stimulation. Controlled triggering can include triggering that occurs at a known time or known times. As an example, a method can include receiving seismic energy via receivers in an offset well that is offset from a stimulation well.

As an example, a source disposed in a well can be a piezoelectric source where a piezoelectric effect generates seismic energy that can travel into a formation. As an example, a source can be a directional source. As an example, a source can have a planned emission frequency or range of frequencies. For example, a workflow can include pre-determining an emission frequency or range of frequencies and selecting a source and/or adjusting a source to emit energy at the pre-determined emission frequency or range of frequencies.

As an example, a crosswell calibrated velocity model information can be calibrated based at least in part on seismic data associated with a horizontal well portion of a well. As an example, a crosswell calibrated velocity model information can be calibrated based at least in part on seismic data associated with a horizontal well portion and a vertical well portion of a well. In such an example, the vertical portion may be in material (e.g., rock) that is substantially the same as material about a horizontal portion of the well and/or that differs from material about a horizontal portion of the well.

As an example, crosswell calibrated velocity model information can include information based a velocity model that includes at least one Thomsen parameter.

As an example, a stimulation can be a first stage of a multistage stimulation. In such an example, for a second stage of the multistage stimulation, a method can include repeating receiving of seismic data, receiving of crosswell calibrated velocity model information and locating a microseismic event generated by the second stage.

As an example, a method can include receiving crosswell calibrated velocity model information at least in part by receiving information from a stored data structure such as, for example, a look-up table. In such an example, a storage device or a storage system can include stored crosswell calibrated velocity model information that can be accessed in an on-demand manner, for example, responsive to a transmission and receipt of a request.

As an example, a method can include locating a plurality of microseismic events serially. Such a method may optionally be performed in real-time, where locating of a microseismic event occurs within a time period of the order of minutes after occurrence of the microseismic event. For example, consider locating an event within a time period of less than about 10 minutes after occurrence of the event. As an example, in a real-time scenario, location of an event or locations of events may be utilized to adjust a stimulation treatment. For example, consider adjusting one or more parameters of a hydraulic fracturing operation based at least in part on location of an event or locations of events during performance of the hydraulic fracturing operation. As an example, a method can include modeling stimulation of a formation to generate at least one modeled fracture where such modeling can be based at least in part on a determined location of a microseismic event or determined locations of microseismic events as associated with a stimulation operation (e.g., one or more stages).

As an example, a system can include a processor; memory accessible by the processor; processor-executable instructions stored in the memory that include instructions to instruct the system to: receive seismic data responsive to stimulation of an anisotropic formation via a well disposed in the anisotropic formation; receive crosswell calibrated velocity model information that spans a depth range of the anisotropic formation; locate a microseismic event generated by the stimulation based at least in part on a portion of the received seismic data and based at least in part on the crosswell calibrated velocity model information; and render the located microseismic event to a display with respect to one or more dimensions of the formation. In such an example, the system can include instructions to generate the crosswell calibrated velocity model information.

As an example, one or more computer-readable storage media can include computer-executable instructions to instruct a system to: receive seismic data responsive to stimulation of an anisotropic formation via a well disposed in the formation; receive crosswell calibrated velocity model information that spans a depth range of the anisotropic formation; locate a microseismic event generated by the stimulation based at least in part on a portion of the received seismic data and based at least in part on the crosswell calibrated velocity model information; and render the located microseismic event to a display with respect to one or more dimensions of the anisotropic formation.

As an example, a system may include instructions, which may be provided to analyze data, control a process, perform a task, perform a workstep, perform a workflow, etc.

Figure 12:
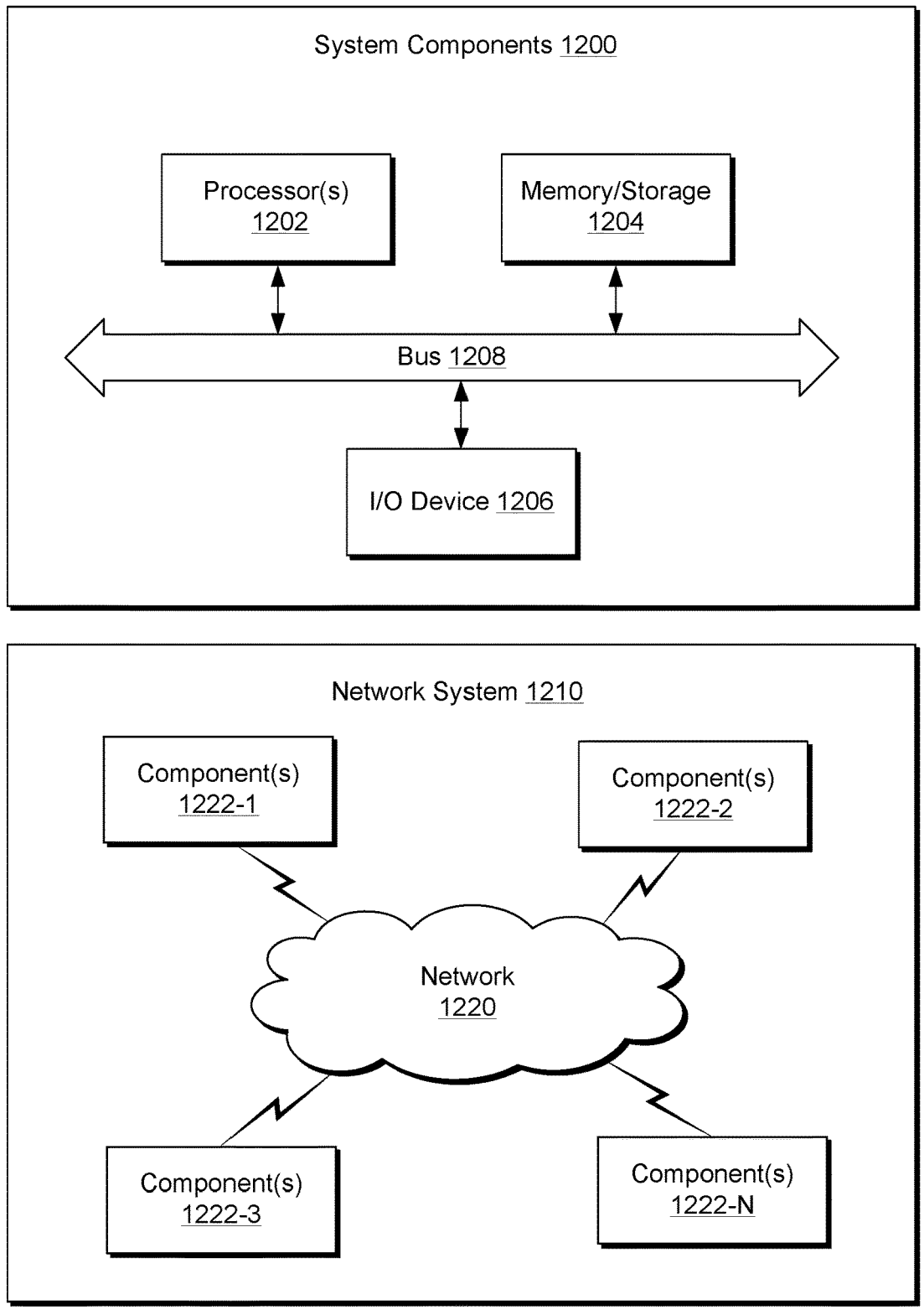
FIG. 12 illustrates example components of a system and a networked system.

FIG. 12 shows components of an example of a computing system 1200 and an example of a networked system 1210. The system 1200 includes one or more processors 1202, memory and/or storage components 1204, one or more input and/or output devices 1206 and a bus 1208. In an example embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving a velocity model derived via compressional (P) wave signals versus depth in a geologic environment that comprises an anisotropic formation comprising one or more subsurface layers;
receiving compressional (P) wave signals and shear (S) wave signals that span a depth range of the anisotropic formation, wherein the compressional (P) wave signals and the shear (S) wave signals are generated using a first controlled electric source disposed in a first kickoff portion of a first well and a second controlled electric source disposed in a first toe portion of the first well, wherein the first well is drilled from a surface layer into the anisotropic formation to form a first bore, wherein the first bore comprises the first kickoff portion spanned from the surface layer to the anisotropic formation and connected to the first toe portion spanned along the one or more subsurface layers via a first heel portion, and wherein the compressional (P) wave signals and the shear (S) wave signals are acquired via a first receiver array disposed in a second toe portion and a second receiver array disposed in a second heel portion and a second kickoff portion of a second well, wherein the second well is drilled from the surface layer into the anisotropic formation to form a second bore, wherein the second bore comprises the second kickoff portion spanned from the surface layer to the anisotropic formation and connected to the second toe portion spanned along the one or more subsurface layers via the second heel portion;
calibrating vertical and horizontal velocities of the velocity model using the compressional (P) wave signals and the shear (S) wave signals generated by the first controlled electric source and the second controlled electric source;
generating a crosswell calibrated velocity model based on the calibrated vertical and horizontal velocities;
receiving first seismic data responsive to a first stage of stimulation of the anisotropic formation via a first perforation in the first toe portion of the first well disposed in the anisotropic formation, wherein the first seismic data comprise seismic data received by the receiver array;

revising information stored in a look-up table based at least in part on the first seismic data; locating a first microseismic event generated by the first stage of stimulation using at least a portion of the received first seismic data, the revised information, and the crosswell calibrated velocity model, wherein the crosswell calibrated velocity model is generated without using the first seismic data generated by the first perforation;

rendering the located first microseismic event generated by the first stage of stimulation with respect to one or more dimensions of the anisotropic formation via a display;

adjusting one or more parameters of a second stage of stimulation of the anisotropic formation based at least in part on the first microseismic event;

receiving second seismic data responsive to the second stage of stimulation of the anisotropic formation via a second perforation in the first toe portion of the first well disposed in the anisotropic formation, wherein the second seismic data comprise seismic data received by the receiver array;

locating a second microseismic event generated by the second stage of stimulation using at least a portion of the received second seismic data and using the crosswell calibrated velocity model, wherein the crosswell calibrated velocity model is generated without using the second seismic data generated by the second perforation; and rendering the second microseismic event generated by the second stage of stimulation with respect to the one or more dimensions of the anisotropic formation via the display, and transmitting information from the first microseismic event and second microseismic event to control, adjust, or initiate one or more operations of equipment associated with the geologic environment.

2. The method of claim 1 comprising generating the shear (S) wave signals that span a depth range of the anisotropic formation.

3. The method of claim 2 wherein the generating comprises controlled triggering of at least one of the at least one controlled electric source in the first well or an offset well.

4. The method of claim 3 wherein the receiver array is in the offset well or the first well, respectively.

5. The method of claim 3 wherein the triggering occurs at a known time.

6. The method of claim 1 wherein the at least one controlled electric source comprises at least one piezoelectric source.

7. The method of claim 1 wherein the at least one controlled electric source comprises at least one directional source.

8. The method of claim 1 wherein at least one of the at least one controlled electric source comprises a planned emission frequency or range of frequencies.

9. The method of claim 1 wherein the crosswell calibrated velocity model comprises information based on at least one Thomsen parameter.

10. The method of claim 1 wherein the crosswell calibrated velocity model comprises a look-up table.

11. The method of claim 1 comprising locating a plurality of microseismic events serially.

12. The method of claim 1 comprising modeling at least one of the first stage of stimulation and the second stage of stimulation to generate at least one modeled fracture.

13. The method of claim 1 comprising selecting at least a portion of the compressional (P) wave signals and shear (S) wave signals that span the depth range of the anisotropic formation based on a shear criterion that accounts for shear signal quality of controlled source seismic energy received by the receiver array.

14. The method of claim 1 wherein the first and second controlled electric sources emit seismic energy at a frequency of 100 Hz to 2,000 Hz.

15. The method of claim 1 comprising generating the shear (S) wave signals that span a depth range of the anisotropic formation, wherein the generating comprises controlled triggering of at least one of the first controlled electric source and the second controlled electric source in an offset well.

16. The method of claim 1 comprising generating the shear (S) wave signals that span a depth range of the anisotropic formation, wherein the generating comprises controlled triggering of at least one of the first controlled electric source and the second controlled electric source in an offset well, and wherein the receiver array is in the first well.

17. The method of claim 1 wherein at least one of the first controlled electric source and the second controlled electric source is located on an upper surface of the geologic environment.

18. A system comprising: a processor; memory accessible by the processor;

processor-executable instructions stored in the memory that comprise instructions to instruct the system to:
receive a velocity model derived via compressional (P) wave signals versus depth in a geologic environment that comprises an anisotropic formation comprising one or more subsurface layers;
receive compressional (P) wave signals and shear (S) wave signals that span a depth range of the anisotropic formation, wherein the compressional (P) wave signals and the shear (S) wave signals are generated using a first controlled electric source disposed in a first kickoff portion of a first well and a second controlled electric source disposed in a first toe portion of the first well, wherein the first well is drilled from a surface layer into the anisotropic formation to form a first bore, wherein the first bore comprises the first kickoff portion spanned from the surface layer to the anisotropic formation and connected to the first toe portion spanned along the one or more subsurface layers via a first heel portion, and wherein the compressional (P) wave signals and the shear (S) wave signals are acquired via a first receiver array disposed in a second toe portion and a second receiver array disposed in a second heel portion and a second kickoff portion of a second well, wherein the second well is drilled from the surface layer into the anisotropic formation to form a second bore, wherein the second bore comprises the second kickoff portion spanned from the surface layer to the anisotropic formation and connected to the second toe portion spanned along the one or more subsurface layers via the second heel portion;
calibrate vertical and horizontal velocities of the velocity model using the compressional (P) wave signals and the shear (S) wave signals generated by the first controlled electric source and the second controlled electric source;
generate a crosswell calibrated velocity model based on the calibrated vertical and horizontal velocities;

receive first seismic data responsive to a first stage of stimulation of the anisotropic formation via a first perforation in the first toe portion of the first well disposed in the anisotropic formation, wherein the first seismic data comprise seismic data received by the receiver array;

revise information stored in a look-up table based at least in part on the first seismic data;

locate a first microseismic event generated by the first stage of stimulation using at least a portion of the received first seismic data, the revised information, and the crosswell calibrated velocity model, wherein the crosswell calibrated velocity model is generated without using the first seismic data generated by the first perforation;

render the located first microseismic event generated by the first stage of stimulation with respect to one or more dimensions of the anisotropic formation via a display;

adjust one or more parameters of a second stage of stimulation of the anisotropic formation based at least in part on the first microseismic event;

receive second seismic data responsive to the second stage of stimulation of the anisotropic formation via a second perforation in the first toe portion of the first well disposed in the anisotropic formation, wherein the second seismic data comprise seismic data received by the receiver array;

locate a second microseismic event generated by the second stage of stimulation using at least a portion of the received second seismic data and using the crosswell calibrated velocity model, wherein the crosswell calibrated velocity model is generated without using seismic data generated by the second perforation;

and render the located second microseismic event generated by the second stage of stimulation with respect to the one or more dimensions of the anisotropic formation.

19. One or more non-transitory computer readable medium containing computer instructions stored therein for causing a computer processor to:

receive a velocity model derived via compressional (P) wave signals versus depth in a geologic environment that comprises an anisotropic formation comprising one or more subsurface layers;

receive compressional (P) wave signals and shear (S) wave signals that span a depth range of the anisotropic formation, wherein the compressional (P) wave signals and the shear (S) wave signals are generated using a first controlled electric source disposed in a first kickoff portion of a first well and a second controlled electric source disposed in a first toe portion of the first well, wherein the first well is drilled from a surface layer into the anisotropic formation to form a first bore, wherein the first bore comprises the first kickoff portion spanned from the surface layer to the anisotropic formation and connected to the first toe portion spanned along the one or more subsurface layers via a first heel portion, and wherein the compressional (P) wave signals and the shear (S) wave signals are acquired via a first receiver array disposed in a second toe portion and a second receiver array disposed in a second heel portion and a second kickoff portion of a second well, wherein the second well is drilled from the surface layer into the anisotropic formation to form a second bore, wherein the second bore comprises the second kickoff portion spanned from the surface layer to the anisotropic formation and connected to the second toe portion spanned along the one or more subsurface layers via the second heel portion;

calibrate vertical and horizontal velocities of the velocity model using the compressional (P) wave signals and the shear (S) wave signals generated by the first controlled electric source and the second controlled electric source;

generate and store a crosswell calibrated velocity model based on the calibrated vertical and horizontal velocities;

receive first seismic data responsive to a first stage of stimulation of the anisotropic formation via a first perforation in the first toe portion of the first well disposed in the anisotropic formation, wherein the first seismic data comprise seismic data received by the receiver array;

revise information stored in a look-up table based at least in part on the first seismic data;

locate a first microseismic event generated by the first stage of stimulation using at least a portion of the received first seismic data, the revised information, and the crosswell calibrated velocity model, wherein the crosswell calibrated velocity model is generated without using seismic data generated by the first perforation;

render the located first microseismic event generated by the first stage of stimulation with respect to one or more dimensions of the anisotropic formation via a display;

adjust one or more parameters of a second stage of stimulation of the anisotropic formation based at least in part on the first microseismic event;

receive second seismic data responsive to the second stage of stimulation of the anisotropic formation via a second perforation in the first toe portion of the first well disposed in the anisotropic formation, wherein the second seismic data comprise seismic data received by the receiver array;

locate a second microseismic event generated by the second stage of stimulation using at least a portion of the received second seismic data and using the crosswell calibrated velocity model, wherein the crosswell calibrated velocity model is generated without using seismic data generated by the second perforation;

and render the located second microseismic event generated by the second stage of stimulation with respect to the one or more dimensions of the anisotropic formation via the display, and transmitting information from the first microseismic event and second microseismic event to control, adjust, or initiate one or more operations of equipment associated with the geologic environment.

* * * * *